US011210851B1

(12) United States Patent
Nussbaum et al.

(10) Patent No.: US 11,210,851 B1
(45) Date of Patent: Dec. 28, 2021

(54) SYSTEMS AND METHODS FOR LABELING 3D MODELS USING VIRTUAL REALITY AND AUGMENTED REALITY

(71) Applicant: State Farm Mutual Automobile Insurance Company, Bloomington, IL (US)

(72) Inventors: Bryan Nussbaum, Bloomington, IL (US); Jeremy Carnahan, Normal, IL (US); Ryan Knuffman, Danvers, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 16/543,127

(22) Filed: Aug. 16, 2019

Related U.S. Application Data

(60) Provisional application No. 62/861,779, filed on Jun. 14, 2019.

(51) Int. Cl.
*G06T 17/20* (2006.01)
*G06K 9/00* (2006.01)
*G06T 19/00* (2011.01)
*H04W 4/021* (2018.01)
*G06F 16/58* (2019.01)

(52) U.S. Cl.
CPC ........ *G06T 17/205* (2013.01); *G06F 16/5866* (2019.01); *G06K 9/00671* (2013.01); *G06T 19/006* (2013.01); *H04W 4/021* (2013.01)

(58) Field of Classification Search
CPC .... G06F 16/5866; H04W 4/021; G06T 17/00; G06T 17/05; G06T 17/205; G06T 19/00; G06T 19/006
See application file for complete search history.

(56) References Cited

U.S. PATENT DOCUMENTS

| 6,690,393 | B2 | 2/2004 | Heron et al. |
| 8,625,018 | B2 | 1/2014 | Bilbrey et al. |
| 9,070,216 | B2 | 6/2015 | Golparvar-Fard et al. |
| 9,779,550 | B2 | 10/2017 | Tobita |
| 9,836,890 | B2 | 12/2017 | Jurgenson et al. |
| 10,139,985 | B2 | 11/2018 | Mildrew et al. |
| 10,169,680 | B1 | 1/2019 | Sachdeva et al. |
| 2013/0278631 | A1 | 10/2013 | Border et al. |

(Continued)

OTHER PUBLICATIONS

Hassan Abu Alhaija et al., "Augmented Reality Meets Computer Vision : Efficient Data Generation for Urban Driving Scenes", Aug. 4, 2017, 12 pages.

(Continued)

*Primary Examiner* — Diane M Wills
(74) *Attorney, Agent, or Firm* — Armstrong Teasdale LLP

(57) ABSTRACT

A virtual reality (VR) labeling computer system configured to receive a 3D model, process the 3D model using object recognition, identify at least one environmental feature within the 3D model, generate a processed 3D model including the at least one environmental feature, display a VR environment based upon the processed 3D model; receive user input including labeling data associated with the environmental feature; generate a labeled 3D model by embedding the labeling data into the processed 3D model; and generate training data based upon the labeled 3D model.

25 Claims, 15 Drawing Sheets

(56) References Cited

U.S. PATENT DOCUMENTS

| | | |
|---|---|---|
| 2016/0171767 A1 | 6/2016 | Anderson |
| 2017/0148222 A1* | 5/2017 | Holzer et al. |
| 2017/0243352 A1* | 8/2017 | Kutliroff ............... G06T 19/006 |
| 2018/0143756 A1* | 5/2018 | Mildrew ............... G06F 3/0482 |
| 2019/0026958 A1* | 1/2019 | Gausebeck ............. G06T 7/579 |
| 2019/0094981 A1* | 3/2019 | Bradski .................. G06F 3/011 |
| 2019/0122085 A1 | 4/2019 | Tout et al. |
| 2019/0197778 A1* | 6/2019 | Sachdeva ................ G06T 17/05 |
| 2019/0213790 A1* | 7/2019 | Taguchi ............. G01C 21/3673 |
| 2020/0118279 A1* | 4/2020 | Abreu ................... G06K 9/621 |
| 2020/0211286 A1* | 7/2020 | Kelsey ................ G06K 9/2081 |
| 2021/0081714 A1* | 3/2021 | Roy Chowdhury .... G06T 7/174 |

OTHER PUBLICATIONS

Yonglin Tian et al., "Training and Testing Object Detectors with Virtual Images", Dec. 22, 2017, 8 pages.

Andreas Geiger, "Generating Training Data for Deep Neural Networks by exploiting LIDAR, Cameras and Maps", Autonomous Vision Group, Oct. 23, 2017, 126 pages.

Google Search, "labeling 3D data for machine learning in virtual reality", Feb. 25, 2019, 2 pages.

* cited by examiner

SYSTEMS AND METHODS FOR LABELING 3D MODELS USING VIRTUAL REALITY AND AUGMENTED REALITY

CROSS-REFERENCE TO RELATED APPLICATIONS

This application claims the benefit of priority to U.S. Provisional Patent Application No. 62/861,779, filed Jun. 14, 2019, entitled "SYSTEMS AND METHODS FOR LABELING 3D MODELS USING VIRTUAL REALITY AND AUGMENTED REALITY," the entire contents and disclosure of which are hereby incorporated by reference herein in their entirety.

FIELD OF THE INVENTION

The present disclosure relates to labeling 3-dimensional (3D) models and, more particularly, to a system and method for labeling 3D models using virtual and/or augmented reality systems.

BACKGROUND

Machine learning (ML) and artificial intelligence (AI) are techniques increasingly utilized by computer systems for processing data and carrying out tasks. ML and AI often involve training models which may then be used to process raw data and generate useful outputs. For example, in supervised machine learning, a model may be trained to identify pictures that include an image of a cat. The model may be trained using numerous labeled images, where the labels denote whether or not the image contains a cat. The trained model may then be used to identify if another image contains a cat.

As ML and AI become more ubiquitous in technological applications, be it big data analysis, robotics, autonomous vehicles, digital personal assistants, or image recognition systems, the amount of data required for training ML and AI systems is increasing. Without a more efficient way to generate training data, the development of ML and AI systems may be stunted. Efficient methods for generating reliable training data, then, are of great importance for promoting the continued advancement of AI and ML technologies.

Simultaneous to the evolution of ML and AI systems, virtual reality (VR) and augmented reality (AR) systems are quickly developing as new mediums for interacting with a digital environment. VR systems immerse users in a digital environment (e.g., through a VR headset), such that the user is effectively positioned within a "virtual" world. AR systems overlay real-world environments with digital content (e.g., aspects of a digital environment), such that the user experiences the real world "augmented" by digital data. In addition to applications for user enjoyment (e.g., VR video games), VR and AR allow a user to experience and interact with a digital environment in a new way.

Currently, conventional systems for generating labeled training data for ML and AI face a number of challenges. First, labeling is time intensive for users manually labeling objects and features in 3D models, especially given difficulties in navigating 3D environments in conventional systems. Additionally, difficulties in labeling may lead to increased user error, such as not labeling unnoticed objects, mislabeling objects, or bounding objects in the wrong position or with the wrong size/orientation boundary. Identified objects and labels in 3D models are also difficult to verify against potential real-world counterparts. As such, a system and process for alleviating these difficulties are desired.

BRIEF SUMMARY

The present embodiments may relate to systems and methods for labeling objects in three dimensional (3D) models using virtual reality (VR) and augmented reality (AR). The system may include a VR computing device, a model processing (MP) computing device, a third party computing device, and a database.

In one aspect, a computer-implemented method for labeling a 3D model using VR may be provided. The method may be implemented by a VR computer system including at least one processor. The method may include: (i) receiving the 3D model; (ii) processing the 3D model using object recognition; (iii) identifying at least one environmental feature within the 3D model; (iv) generating a processed 3D model including the at least one environmental feature; (v) displaying a VR environment based upon the processed 3D model; (vi) receiving user input including labeling data associated with the environmental feature; (vii) generating a labeled 3D model by embedding the labeling data into the processed 3D model; and/or (viii) and generating training data based upon the labeled 3D model. The method may include additional, less, or alternate actions, including those discussed elsewhere herein.

In another aspect, a virtual reality (VR) labeling computer system for labeling a three dimensional (3D) model using VR may be provided. The VR labeling computer system may include at least one processor in communication with at least one memory device, and the at least one processor may be configured to: (i) receive the 3D model; (ii) process the 3D model using object recognition; (iii) identify at least one environmental feature within the 3D model; (iv) generate a processed 3D model including the at least one environmental feature; (v) display a VR environment based upon the processed 3D model; (vi) receive user input including labeling data associated with the environmental feature; (vii) generate a labeled 3D model by embedding the labeling data into the processed 3D model; and/or (vii) generate training data based upon the labeled 3D model. The system may include additional, less, or alternate functionality, including that discussed elsewhere herein.

In another aspect, at least one non-transitory computer-readable storage media having computer-executable instructions embodied thereon for labeling a three dimensional (3D) model using virtual reality (VR) may be provided. When executed by at least one processor, the computer-executable instructions may cause the processor to: (i) receive the 3D model; (ii) process the 3D model using object recognition; (iii) identify at least one environmental feature within the 3D model; (iv) generate a processed 3D model including the at least one environmental feature; (v) display a VR environment based upon the processed 3D model; (vi) receive user input including labeling data associated with the environmental feature; (vii) generate a labeled 3D model by embedding the labeling data into the processed 3D model; and (vii) generate training data based upon the labeled 3D model. The instructions may direct additional, less, or alternate functionality, including that discussed elsewhere herein.

In yet another aspect, a computer-implemented method for labeling a three dimensional (3D) model using virtual reality (VR) may be provided. The method may be implemented by a VR labeling computer system including a model processing (MP) computing device and a VR computing device. The method may include: (i) receiving, by the MP computing device, the 3D model, the 3D model including at least one unidentified environmental feature; (ii) identifying, by the MP computing device, an environmental feature corresponding to the unidentified environmental feature based upon analysis of the 3D model; (iii) transmitting, by the MP computing device, the 3D model and environmental feature to the VR computing device; (iv) displaying, by the VR computing device, the VR environment based upon the 3D model and environmental feature; (v) receiving, by the VR computing device, user input including labeling data associated with the environmental feature; (vi) transmitting, by the VR computing device, the 3D model, the environmental feature, and the labeling data to the MP computing device as a labeled 3D model; and/or (vii) generating, by the MP computing device, training data comprising the labeled 3D model. The method may include additional, less, or alternate actions, including those discussed elsewhere herein.

In another aspect, a virtual reality (VR) labeling computer system for labeling a three dimensional (3D) model using VR may be provided. The VR labeling computer system may include a VR computing device, a model processing (MP) computing device, and at least one processor in communication with at least one memory device, and the at least one processor may be configured to: (i) receive, by the MP computing device, the 3D model, the 3D model including at least one unidentified environmental feature; (ii) identify, by the MP computing device, an environmental feature corresponding to the unidentified environmental feature based upon analysis of the 3D model; (iii) transmit, by the MP computing device, the 3D model and environmental feature to the VR computing device; (iv) display, by the VR computing device, the VR environment based upon the 3D model and environmental feature; (v) receive, by the VR computing device, user input including labeling data associated with the environmental feature; (vi) transmit, by the VR computing device, the 3D model, the environmental feature, and the labeling data to the MP computing device as a labeled 3D model; and/or (vii) generate, by the MP computing device, training data comprising the labeled 3D model. The computer system may include additional, less, or alternate functionality, including that discussed elsewhere herein.

In another aspect, at least one non-transitory computer-readable storage media having computer-executable instructions embodied thereon for labeling a three dimensional (3D) model using virtual reality (VR) may be provided. When executed by at least one processor, the computer-executable instructions may cause the processor to: (i) receive, by the MP computing device, the 3D model, the 3D model including at least one unidentified environmental feature; (ii) identify, by the MP computing device, an environmental feature corresponding to the unidentified environmental feature based upon analysis of the 3D model; (iii) transmit, by the MP computing device, the 3D model and environmental feature to the VR computing device; (iv) display, by the VR computing device, the VR environment based upon the 3D model and environmental feature; (v) receive, by the VR computing device, user input including labeling data associated with the environmental feature; (vi) transmit, by the VR computing device, the 3D model, the environmental feature, and the labeling data to the MP computing device as a labeled 3D model; and/or (vii) generate, by the MP computing device, training data comprising the labeled 3D model. The instructions may direct additional, less, or alternate functionality, including that discussed elsewhere herein.

In yet another aspect, a computer-implemented method for labeling a 3D model using augmented reality (AR) may be provided. The method may be implemented by a AR computer system including at least one processor. The method may include: (i) receiving the 3D model; (ii) processing the 3D model using object recognition; (iii) identifying at least one environmental feature within the 3D model; (iv) generating a processed 3D model including the at least one environmental feature; (v) displaying a AR environment based upon the processed 3D model; (vi) receiving user input including labeling data associated with the environmental feature; (vii) generating a labeled 3D model by embedding the labeling data into the processed 3D model; and/or (viii) generating training data based upon the labeled 3D model. The method may include additional, less, or alternate functionality, including that discussed elsewhere herein.

In another aspect, an augmented reality (AR) labeling computer system for labeling a three dimensional (3D) model using AR may be provided. The AR labeling computer system may include at least one processor in communication with at least one memory device, and the at least one processor may be configured to: (i) receive the 3D model; (ii) process the 3D model using object recognition; (iii) identify at least one environmental feature within the 3D model; (iv) generate a processed 3D model including the at least one environmental feature; (v) display a AR environment based upon the processed 3D model; (vi) receive user input including labeling data associated with the environmental feature; (vii) generate a labeled 3D model by embedding the labeling data into the processed 3D model; and/or (vii) generate training data based upon the labeled 3D model. The computer system may include additional, less, or alternate functionality, including that discussed elsewhere herein.

In another aspect, at least one non-transitory computer-readable storage media having computer-executable instructions embodied thereon for labeling a three dimensional (3D) model using augmented reality (AR) may be provided. When executed by at least one processor, the computer-executable instructions may cause the processor to: (i) receive the 3D model; (ii) process the 3D model using object recognition; (iii) identify at least one environmental feature within the 3D model; (iv) generate a processed 3D model including the at least one environmental feature; (v) display a AR environment based upon the processed 3D model; (vi) receive user input including labeling data associated with the environmental feature; (vii) generate a labeled 3D model by embedding the labeling data into the processed 3D model; and/or (vii) generate training data based upon the labeled 3D model. The instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, it should be understood that the present embodiments are not limited to the precise arrangements and are instrumentalities shown. Wherever possible, the following description refers to the reference numerals included in the following Figures, in which features depicted in multiple Figures are designated with consistent reference numerals.

Figure 1:
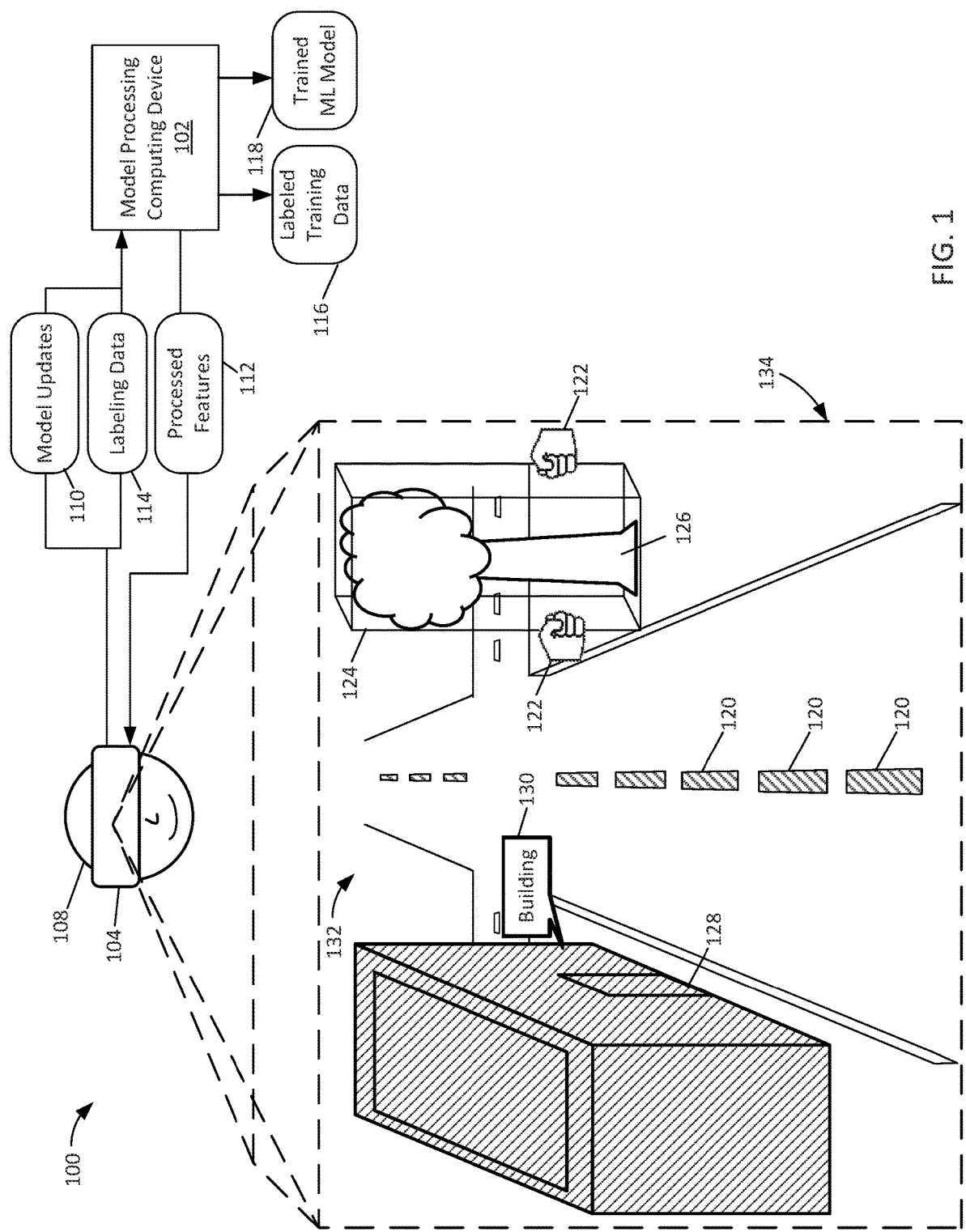
FIG. 1 illustrates an exemplary VR labeling computer system.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for generating training data by labeling 3D models using virtual reality (VR) and/or augmented reality (AR). In one exemplary embodiment, the process may be performed by a VR labeling (VRL) computer system.
Training Data and 3D Model Labeling In some embodiments, machine learning (ML) (e.g., artificial intelligence or "AI") systems use training data to train a ML model, and the trained model may be used for processing subsequent data inputs. For example, a ML model may be developed for recognizing whether an image contains a cat. In such an example, training data may include a large number of 2D images, where each image is labeled as containing or not containing a cat. The untrained ML model may be trained with the training data to identify if an image contains a cat.

In a more complex system, a ML model may be developed to not only recognize if an image contains a cat, but also to outline or highlight the image of the cat. In such a system, the training data may include a large number of images, each image not only labeled as containing or not containing a cat, but also including delineations indicating where the cat(s) are in each image. In one example, the delineations may be drawn by hand. The untrained ML model is trained on such training data to identify not only when an image contains a cat, but also where the cat appears in the image (e.g., how to segment the cat from the rest of the image).

In some embodiments, an ML model may be trained to perform object recognition in 3D models. In one example, an ML model may be developed for identifying and recognizing objects detected in a real-world environment. Training data for the ML model may include 3D models with objects delineated and labeled (e.g., a tree is outlined and labeled as a tree). The untrained ML model may be trained with such training data and learn to identify different objects in an environment.

Generating training data is a crucial aspect of effectively training a ML model. For ML systems focused on object and image recognition, delineating and labeling objects accurately is paramount when preparing training data. In 2D images, the process of delineating and labeling the number of images required for effective training may be very time consuming, and the time requirement is increased in labeling objects in a 3D environment (e.g., due to increased difficulties with navigating 3D environments, performing input gestures within the 3D environment, and other limitations related to interfacing with a 3D environment through a 2D screen).

Certain techniques, such as segmentation, may be utilized for more effectively delineating objects in a 3D model. In one embodiment, a segmentation algorithm is applied to a bounded region in a 3D model, and a discrete outline of an object within the region is generated. For example, a bounding frame may be placed around a tree in a 3D environment and a segmentation algorithm may be applied to the bounding frame, thereby identifying the tree as an individual object and more accurately bounding the tree object. In another embodiment, a segmentation algorithm may be applied to an area including data points representing multiple objects, and at least one of the objects is identified.

In an exemplary embodiment, semantic segmentation may be used to identify different classes of objects in a 3D model without making additional determinations about a specific label for each object. In other words, groups of data points are automatically identified as representing objects distinct from the rest of the environment, but beyond a general label such as "ground", "sky", "object 1", "object 2", etc., no qualitative label is assigned to the objects.

Even utilizing such segmentation techniques to assist in object recognition, efficiently and accurately identifying and labeling objects in a 3D model presents many difficulties, including challenges in effectively navigating a 3D environment, accurately delineating 3D objects, and labeling identified objects in the 3D space.

As used herein, "ML model" refers to any mathematical model, statistical model, decision-making model, algorithm, or function that includes machine learning functionality. A ML model may be trained or untrained. As used herein, "trained model" or "trained ML model" refers to any ML model that has been trained through the processing of training data. As used herein, "untrained model" or "untrained ML model" refers to any ML model that has not been trained through the processing of training data.

As used herein, "3D model" refers to data that represents an environment, a space, and/or environmental features (e.g., objects) in digital 3D. The 3D environment, space, and/or environmental features may be based upon a real-world environment or not. A 3D model may include, for example, a point cloud, a wireframe model, a surface model, a solid model, a mesh model, and/or any other type of model which represents an environment, space, or environmental features in a digital 3D space. Additionally, a 3D model based upon a real-world location may be geo-referenced to that location, such that at least some of the points of the 3D model have an associated geolocation. As used herein, "virtual environment" and "digital environment" refer to a rendering of a 3D digital environment based upon a 3D model and experienced by a user through a display device. In other words, a 3D model contains data which is rendered by a display device and displayed to the user as a virtual or digital environment.

As used herein, "environmental features" or "objects" may refer to objects, areas, aspects, features, or other elements of an environment.

Virtual Reality and Augmented Reality

The use of VR and AR for interacting with a 3D model provides a new, efficient interface for delineating and labeling objects in 3D models. VR and AR systems allow a user to interact with a 3D virtual environment in a new way compared to traditional interactions using a 2D display. In VR, a user may be immersed in a virtual environment (e.g., using a VR headset). In other words, a VR device displays images, sounds, etc. to the user in a way that mimics how a user receives sensory stimuli in the real world. In AR, the user may be provided with digital data that overlays objects or environments in the real world. AR devices may use a camera or other input to determine the objects in a user's line of sight and present additional digital data that compliments the real-world environment.

As described in further detail herein, VR and AR technologies may be utilized to more effectively and efficiently carry out the process of labeling 3D models in preparation for model training. In one embodiment, a user interacts with a 3D model using VR. Specifically, the user navigates a virtual environment, applying bounding frames to objects, labeling objects, rotating views, and traversing areas of the virtual environment using a VR device. In other words, the user is immersed in a virtual environment and interacts with the virtual environment through the VR device in order to apply labeling data to the 3D model (e.g., apply labels and annotations) and identify objects in the 3D model (e.g., apply bounding frames, altering surface meshes, etc.).

In another embodiment, a user views a real-world environment and an AR device displays virtual content overlaying the real-world environment. Specifically, if the user is in a geographic location associated with the geographic location of a 3D model, the AR device may overlay the real world environment with virtual objects from the 3D digital environment, allowing the user to interact with the digital environment and digital objects.

As used herein, "VR environment" refers to a digital or virtual environment experienced by or displayed to a user through a VR computing device. In other words, "VR environment" refers to the VR view and functionality experienced by a user through a VR enabled computing device. Conversely, any virtual or digital environment displayed to a user through a VR computing device may be considered a VR environment. As used herein, "AR environment" refers to a digital or virtual environment overlaid on a real-world environment and experienced by a user through a VR/AR computing device. In other words, "AR environment" refers to the AR display and functionality experienced by a user through an AR enabled computing device.

System Overview

Embodiments of the present disclosure relate generally to systems and methods for labeling 3D models using VR and/or AR. More particularly, the present disclosure relates to a computer system, herein described as a VR labeling (VRL) computer system, that enables the identification and labeling of virtual objects in a 3D model using VR and/or AR in order to generate training data for training ML models. The VRL computer system may display a 3D model to a user through a VR computing device, which allows the user to interact with the 3D model and update the 3D model based upon user inputs. In the exemplary embodiment, the VR computing device may utilize VR and/or AR environments. The VRL computer system further includes a model processing (MP) computing device for applying object recognition techniques to the 3D model, aggregating labeled 3D models as training data, and training ML models using labeled training data.

The systems and methods described herein may be implemented using the VRL computer system that includes a MP computing device in communication with a VR computing device. The VR computing device is a device that enables the user to interact with a 3D digital environment through VR and/or AR. The VR computing device includes one or more processors and a memory, which may include a centralized or non-centralized database. The VR computing device is configured to receive a 3D model, receive user commands (e.g., navigation actions and bounding actions), and update the 3D model based upon the user inputs (e.g., labeling objects, bounding objects, selecting objects, etc.).

The MP computing device is configured to receive the updated 3D model from the VR computing device and process the updated 3D model using object recognition techniques (e.g., convolutional neural networks, histogram of oriented gradients feature extraction, edge matching, greyscale matching, gradient matching, interpretation trees, pose clustering, scale-invariant feature transform, speeded up robust features, or bag of words representations) to identify objects in the 3D model. The VR computing device is further configured to receive a processed 3D model from the MP computing device and receive further user inputs including object labels. The MP computing device is further configured to receive a labeled 3D model and generate training data based upon the labeled 3D model or an aggregate of multiple 3D models and train a ML model using the training data. In some embodiments, the MP computing device is configured to train a ML model based upon the training data.

In the exemplary embodiment, a 3D model may represent a real-world environment. For example, a drone may collect aerial images of an environment, and photogrammetry or other image processing techniques may be used to generate a 3D point cloud representing the real-world environment. The 3D point cloud may be used as a 3D model and subsequently updated, processed, and labeled. In some embodiments, the drone may collect LIDAR, sonar, radar, or some other kind of data for generating a 3D digital model.

In some embodiments, the 3D model is generated digitally and may or may not be based upon a real-world environment.

In some embodiments, the VRL computer system is configured to generate various trained ML models that may be used in different applications or fields. For example, the VRL computer system may train ML models that are applied in fields such as autonomous vehicles (AVs), construction, or insurance claims processing.

Trained ML models may be applied in AVs to allow AVs to more effectively navigate through an environment. For example, trained ML models may allow for the identification and classification of objects observed by a camera or LIDAR sensor in communication with an AV's operational system. Additionally, ML models may be utilized by AVs to determine a course of action given the presence of certain obstacles in the environment (e.g., what to do when approaching a stop sign, or what to do when a pedestrian is within a certain range).

Trained ML models may also be applied in construction projects to provide information and analysis of a construction site. For example, a trained ML model may be used to analyze images of a construction zone and identify certain aspects of the construction zone that are compliant or non-compliant with regulations. Additionally, a ML model may be used to identify and classify objects in a construction zone in real-time and offer additional, useful information (e.g., zoning regulations, dimensions of elements of the construction site, etc.) to a user.

Trained ML models may also be utilized in processing insurance claims. In one example, images of a neighborhood may be captured, and a trained model may be used to identify and classify objects within the neighborhood. Additionally, the model may provide additional useful data regarding objects in the neighborhood (e.g., estimated cost of property, dimensions of houses or elements of houses, identification of potential damage, etc.).

In the exemplary embodiment, the VRL computer system further includes a database in communication with the VR computing device and the MP computing device. The database is configured to store any data required by the VR computing device and/or MP computing device, and may specifically store 3D models, VR specific models, object delineations, bounding frames, and labels associated with a 3D model, training data, and/or trained and untrained machine learning models.

Exemplary VR Labeling Computer System

FIG. 1 depicts an exemplary VR labeling system 100 and a data flow within VR labeling system 100. VR labeling system 100 includes VR computing device 104 and model processing (MP) computing device 102. In the exemplary embodiment, a user 108 experiences VR view 134 and interacts with virtual environment 132 using VR computing device 104. VR computing device 104 is a wearable computing device that includes one or more display devices, one or more user input devices (e.g., handheld controllers), and may include an audio output device, microphone, and/or camera (each not separately shown). Based upon user input, VR computing device 104 transmits model updates 110 and/or labeling data 114 to MP computing device 102. MP Computing device 102 may apply object recognition processing to generate processed features 112, which include identified objects. Processed features 112 are displayed to user 108 through VR computing device 104, and VR computing device 104 may receive user inputs labeling the identified objects. VR computing device then transmits labeling data 114 to MP computing device 102 for the generation of labeled training data 116. MP computing device 102 processes labeled 3D models and generates labeled training data 116 based upon the labeled 3D models. MP computing device 102 is further configured to train ML models using labeled training data 116 and generate trained ML model 118.

VR computing device 104 is configured to display virtual environment 132 to user 108, and allow user 108 to interact with virtual environment 132. VR device 104 may receive user inputs from user 108 in various ways, including, but not limited to, tracking hand gestures or eye movements, receiving audio inputs, and receiving text input. In the exemplary embodiment, VR device 104 receives hand gestures from user 108, and VR device 104 may represent the hand gestures as gesture icons 122.

Virtual environment 132 includes a number of virtual objects, including building 128, tree 126, and lane markings 120. In the exemplary embodiment, identified objects may be shaded or otherwise denoted, such as the shading on building 128 and lane markings 120, as shown in FIG. 1. Unidentified virtual objects, such as tree 126, may be a collection of points that, when represented in virtual environment 132, are recognizable as an object to user 108. Virtual environment 132 may further include object labels, such as object label 130. In some embodiments, an object may include an associated object label that is not displayed to user 108.

VR device 104 is configured to allow user 108 to interact with virtual environment 132. In the exemplary embodiment, user 108 may use hand gestures to issue user inputs in virtual environment 132. In one example, user 108 may utilize hand gestures to place bounding frame 124 around tree 126. Bounding frame 124 may be utilized in object recognition processing implemented by MP computing device 102. User 108 may place bounding frames around unidentified objects so that MP computing device 102 is able to implement object recognition techniques and identify specific virtual objects.

In the exemplary embodiment, VR device 104 is further configured to receive input from user 108 to apply labels to identified objects. Building 128 may be selected by user 108, for example by using hand gestures, and user 108 may define object label 130, which is associated with building 128. Object label 130, which is associated with building 128, may include information about the type of virtual object, other characteristics of the virtual object, user annotations, and/or other information associated with the virtual object.

Exemplary Configuration for VR Labeling Computer System

Figure 2:
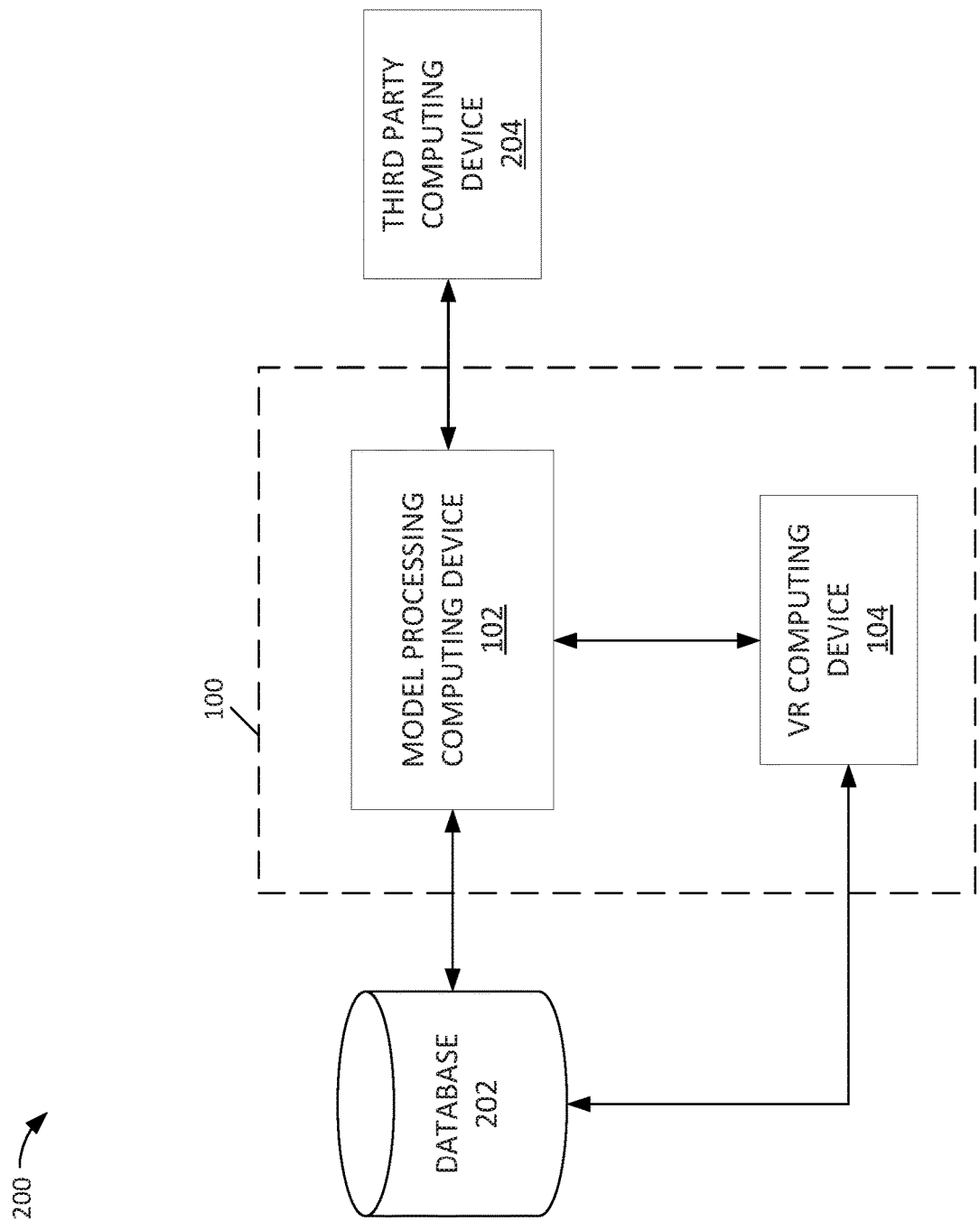
FIG. 2 illustrates an exemplary system configuration including the VR labeling computer system of FIG. 1.

FIG. 2 depicts exemplary system configuration 200, including VR labeling computer system 100. System configuration 200 includes model processing (MP) computing device 102, VR computing device 104, third party computing device 204, and database 202, all of which are in communication with each other. In the exemplary embodiment, VR labeling computer system 100 is configured to allow user 108 (shown in FIG. 1) to manipulate a 3D model using VR or AR, including allowing user 108 to label objects in the 3D model for use in training data for training ML models. Database 202 is configured to store any data required by VR computing device 104 and/or MP computing device 102, such as, for example, 3D models, VR specific models, object delineations, bounding frames, and labels associated with a 3D model, sensor data, geolocation data, user-input data, training data, and/or trained and untrained ML models.

In the exemplary embodiment, VR computing device 104 and MP computing device 102 are remotely coupled (e.g., via a wireless network), with MP computing device 102 operating as a back-end server for conducting more processing-intensive tasks. In alternative embodiments, MP computing device 102 and VR computing device 104 are locally coupled and may be included within the same hardware device.

In the exemplary embodiment, VR computing device 104 is configured to receive a 3D model, from database 202. VR computing device 104 is further configured to display a VR environment, such as VR environment 132 (shown in FIG. 1) to user 108 based upon the 3D model and allow user 108 to interact with the model through the VR environment. VR computing device 104 allows user 108 to navigate the VR environment, select objects, place bounding frames, add labels, define boundary zones, and other functionality through user inputs. VR computing device 104 receives user inputs from user 108 and adjusts the 3D model based upon user 108 commands. VR computing device 104 may transmit the updated model to MP computing device 102. For example, user inputs may include navigating through the VR environment or adding bounding frames around object representations. Any updates to the model, such as added bounding frames, are sent to MP computing device 102.

In the exemplary embodiment, MP computing device 102 is configured to receive the updated model from VR computing device 104. In some embodiments, MP computing device 102 receives the updated model from database 202. MP computing device 102 is further configured to utilize object recognition techniques to identify virtual objects represented in the 3D model or model updates and generate processed model data (e.g., identified objects). MP computing device 102 may transmit the processed model including the identified objects to VR computing device 104. In one example, MP computing device 102 receives a 3D model and implements object recognition processing to identify objects across the entire 3D model. In another example, MP computing device 102 receives an updated model including bounding frames around unidentified objects, and MP computing device 102 implements object recognition on the areas contained within the bounding frames.

VR computing device 104 may be configured to display a VR environment to user 108 based upon the processed model and receive further user input including labeling data associated with identified objects. VR computing device 104 may further be configured to update the processed model with the labeling data, thereby generating a labeled model, and transmit the labeled model and/or labeling data to MP computing device 102. MP computing device 102 may be configured to generate training data from the labeled model and to transmit the training data to third party computing device 204. MP computing device 102 is further configured to receive an untrained ML model from database 202 and train the ML model using the training data.

In the exemplary embodiment, communication between VR computing device 104 and MP computing device 102 is seamless. For example, user 108 may enclose an object representation in a bounding frame using VR computing device 104, and the object may be nearly instantaneously transmitted to MP computing device 102 for object recognition processing. MP computing device 102 may identify the object within the bounding frame and transmit the identified object to VR computing device 104 for display in a manner such that the object is identified and becomes selectable as user 108 continues to interact with the VR environment.

In the exemplary embodiment, VR labeling computer system 100 is further configured to implement an augmented reality (AR) mode for interacting with and labeling a 3D model. VR computing device 104 includes sensors for collecting data about user's 108 real-world environment, including the geolocation of user 108. In the exemplary embodiment, VR computing device 104 is configured to receive geolocation data and sensor input in order to determine the location of user and the orientation of the view of user 108. VR computing device 104 is configured to receive a 3D model from database 202, where the 3D model is based upon a real-world environment and is geo-referenced to that environment. VR computing device 104 is configured to compare the geolocation of user 108 to the geolocation of the 3D model. Upon determining a match between the two geolocations, VR computing device 104 is configured to display an AR environment to user 108 through an AR display component of VR computing device 104. VR computing device 104 is further configured to receive user inputs and alter the 3D model based upon user 108 inputs. VR computing device 104 is further configured to communicate with MP computing device 102 and user 108 in order to identify and label environmental features in the 3D model 508, as described above.

Exemplary Data Flow Using VR Labeling Computer System

Figure 3:
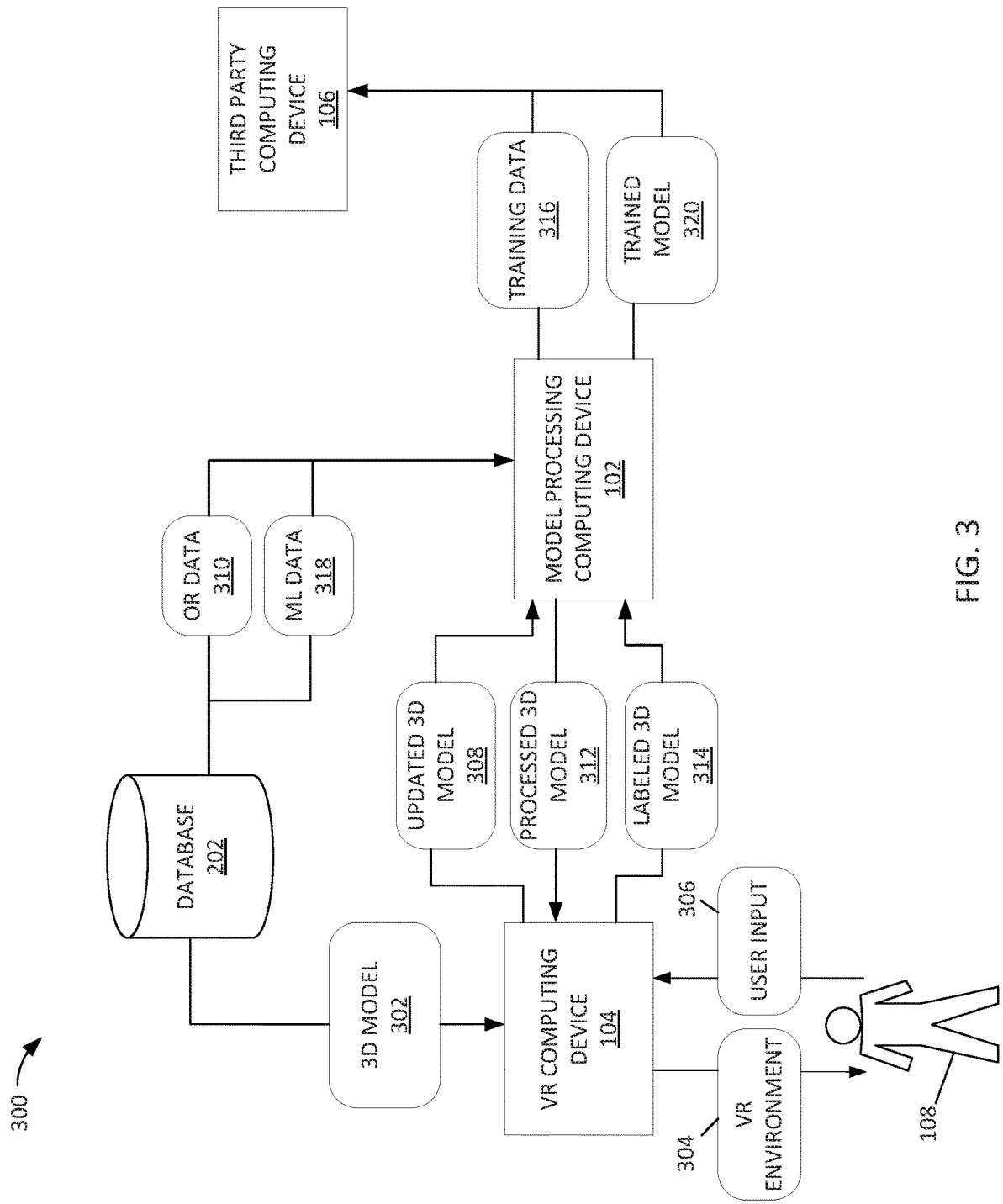
FIG. 3 illustrates an exemplary data flow through the VR labeling computer system of FIG. 1.

FIG. 3 depicts an exemplary data flow 300 using a VR labeling computer system, such as VR labeling computer system 100 (shown in FIG. 1). In the exemplary embodiment, user 108 interacts with VR computing device 104, which is in communication with MP computing device 102 and database 202. MP computing device 102 is in further communication with database 202 and third party computing device 204.

In the exemplary embodiment, VR computing device 104 receives 3D model 302 from database 202. 3D model 302 includes data representing a 3D digital environment, which includes at least one 3D environmental feature (e.g., an object). Initially, 3D model 302 is unsegmented and unlabeled, such that no 3D environmental features are identified or delineated. In other words, 3D model 302 is a collection of unlabeled data points (e.g., surfaces). For example, 3D model 302 may depict an environment that includes a tree as a collection of points such that user 108 viewing a digital representation of 3D model 302 may recognize the points as having the shape and color of a tree. However, the points representing the tree may not contain any labels or meta-data indicating that those points represent a discrete environmental feature.

In alternative embodiments, 3D model 302 includes delineated and/or segmented 3D environmental features. For example, 3D model 302 may depict an environment that includes a building, and the points that represent the building are discretely organized such that the building is identified. In an alternative embodiment, 3D model 302 includes identified and labeled features.

In the exemplary embodiment, VR computing device 104 displays 3D model 302 as VR environment 304 (which may be similar to VR environment 132, shown in FIG. 1) to user 108. In other words, VR computing device 104 displays an immersive virtual environment to user 108, such as VR environment 304, such that user 108 may navigate and interact with VR environment 304 via VR computing device 104. VR computing device 104 may process 3D model 302 to render VR environment 304 to user 108. In some embodiments, VR computing device 104 may convert 3D model 302 to an alternative data format in order to display 3D model 302 as VR environment 304. In some embodiments, 3D model 302 is already formatted for VR environment display.

In the exemplary embodiment, VR computing device 104 receives user input 306 from user 108. User input 306 may include, but is not limited to, navigation instructions for navigating or changing views within VR environment 304, display instructions for altering the way objects or environmental features are displayed within VR environment 304, bounding frame inputs for creating, re-sizing, and/or re-orienting bounding frames, other inputs for placing bounds around an object within VR environment 304, defined zone inputs for creating, re-sizing, and/or re-orienting defined zones (e.g., a bounded or defined area or 3D space in a 3D digital environment) and/or within VR environment 304, selection inputs for selecting identified environmental features, and labeling inputs for applying labels to identified environmental features and adding annotations to environmental features, either within a label or separate from a label.

In the exemplary embodiment, VR computing device 104 receives user inputs 306 via hand gestures made by user 108. For example, user 108 may point to an object, VR computing device 104 may detect and process the hand gesture, and select an environmental feature in VR environment 304 based upon user 108 pointing at it. In alternative embodiments, VR computing device 104 receives user inputs 306 via any combination of hand gestures, eye movements, spoken or audio commands, text inputs, mouse inputs, keyboard inputs, touchscreen inputs, and/or any other user inputs. VR computing device 104 may receive user inputs 306 via any input mechanism.

In the exemplary embodiment, VR computing device 104 is configured to alter or augment 3D model 302 based upon user inputs 306 and transmit updated 3D model 308 to MP computing device 102. Specifically, VR computing device 104 is configured to adjust 3D model 302 to include any bounding frames, labels, annotations, or other model updates specified by user 108 through user inputs 306. For example, VR computing device 104 may receive bounding frame input that defines bounding frames around a plurality of unidentified environmental features within VR environment 304. Additionally, VR computing device 104 may receive labeling inputs including labeling data applied to a plurality of bounding frames and/or identified environmental features. VR Computing device 104 may be configured to update 3D model 302 based upon user inputs 306 and generate updated 3D model 308.

In the exemplary embodiment, VR computing device 104 is further configured to transmit updated 3D model 308 to MP computing device 102 for further processing. MP computing device 102 is configured to process updated 3D model 308 and generate processed 3D model 312. MP computing device 102 applies object recognition techniques to updated 3D model 308 and generates processed 3D model 312 based upon identifying different objects and environmental features in updated 3D model 308. In some embodiments, MP computing device 102 is configured to apply object recognition to specific areas in updated 3D model 308, such as areas defined by bounding frames or defined zones. For example, updated 3D model 308 may include a plurality of bounding frames around unidentified environmental features perceived by user 108, and MP computing device 102 may apply object recognition processing to the data contained in the bounding frames.

In alternative embodiments, MP computing device 102 is configured to apply object recognition to the entire 3D model 302. In the exemplary embodiment, MP computing device 102 is further configured to receive object recognition (OR) data 310 from database 202. OR data 310 may include data used to implement OR processing on a 3D model, such as but not limited to object recognition techniques, algorithms, or engines, trained machine learning models, segmentation techniques, or semantic segmentation techniques.

In the exemplary embodiment, VR computing device 104 receives processed 3D model 312 from MP computing device 102, displays VR environment 304 to user 108 based upon processed 3D model 312, and receives user inputs 306 for further adjusting processed 3D model 312. Based upon user inputs 306 applied to processed 3D model 312, VR computing device 104 generates labeled 3D model 314 and transmits labeled 3D model 314 to MP computing device 102. Specifically, after MP computing device 102 identifies objects and environmental features in processed 3D model 312, VR computing device 104 displays the identified environmental features to user 108 such that user 108 may select, label, or otherwise change the identified environmental features. For example, prior to MP computing device 102 processing updated 3D model 308, representations of trees in updated 3D model 308 may merely be a collection of points or surfaces that look like a tree when displayed to user 108, but that otherwise may contain no data labels or meta data specifically defining those points as a separate "tree" object. However, MP computing device 102 may implement object recognition techniques and identify trees in updated 3D model 308, thereby generating processed 3D model 312. VR computing device 104 then displays processed 3D model 312 to user 108 as VR environment 304, and user 108 is able to select, label, annotate, or otherwise change the environmental features identified in processed 3D model 312.

In one example, MP computing device 102 identifies a plurality of objects such as trees and buildings such that processed 3D model 312 includes these identified objects. User 108 may then be able to select specific objects by interacting with VR environment 304 and add labels to these objects. VR computing device 104 is configured to apply the labels to processed 3D model 312 and generate labeled 3D model 314. VR computing device 104 is further configured to transmit labeled 3D model 314 to MP computing device 102.

In the exemplary embodiment, MP computing device 102 is configured to receive labeled 3D model 314 from VR computing device 104, wherein labeled 3D model 314 contains labeling data applied to identified environmental features. In other words, labeled 3D model 314 contains identified objects and associated labels.

MP computing device 102 is further configured to generate training data 316 based upon labeled 3D model 314. In one embodiment, training data 316 includes a single labeled 3D model, such as labeled 3D model 314. In alternative embodiments, MP computing device 102 generates training data 316 by aggregating multiple labeled 3D models. In an alternative embodiment, MP computing device 102 generates training data 316 by capturing and aggregating multiple areas and/or views of a single or multiple labeled 3D models. MP computing device 102 is configured to transmit training data 316 to third party computing device 204.

MP computing device 102 is further configured to train a ML model using training data 316. MP computing device 102 is configured to receive ML data 318 from database 202, wherein ML data 318 includes any data necessary for training a ML model, such as, but not limited to, an untrained or partially trained model, function coefficients determined during previous training, and specific ML techniques and algorithms. In the exemplary embodiment, MP computing device 102 receives ML data 318 from database 202, wherein ML data 318 includes at least an untrained ML model and a specific ML algorithm. MP computing device 102 is configured to train the ML model using training data 316 and the ML algorithm to generate trained model 320. MP computing device 102 is further configured to transmit trained model 320 to third party computing device 204.

Modular Representation of VR Labeling Computer System

Figure 4:
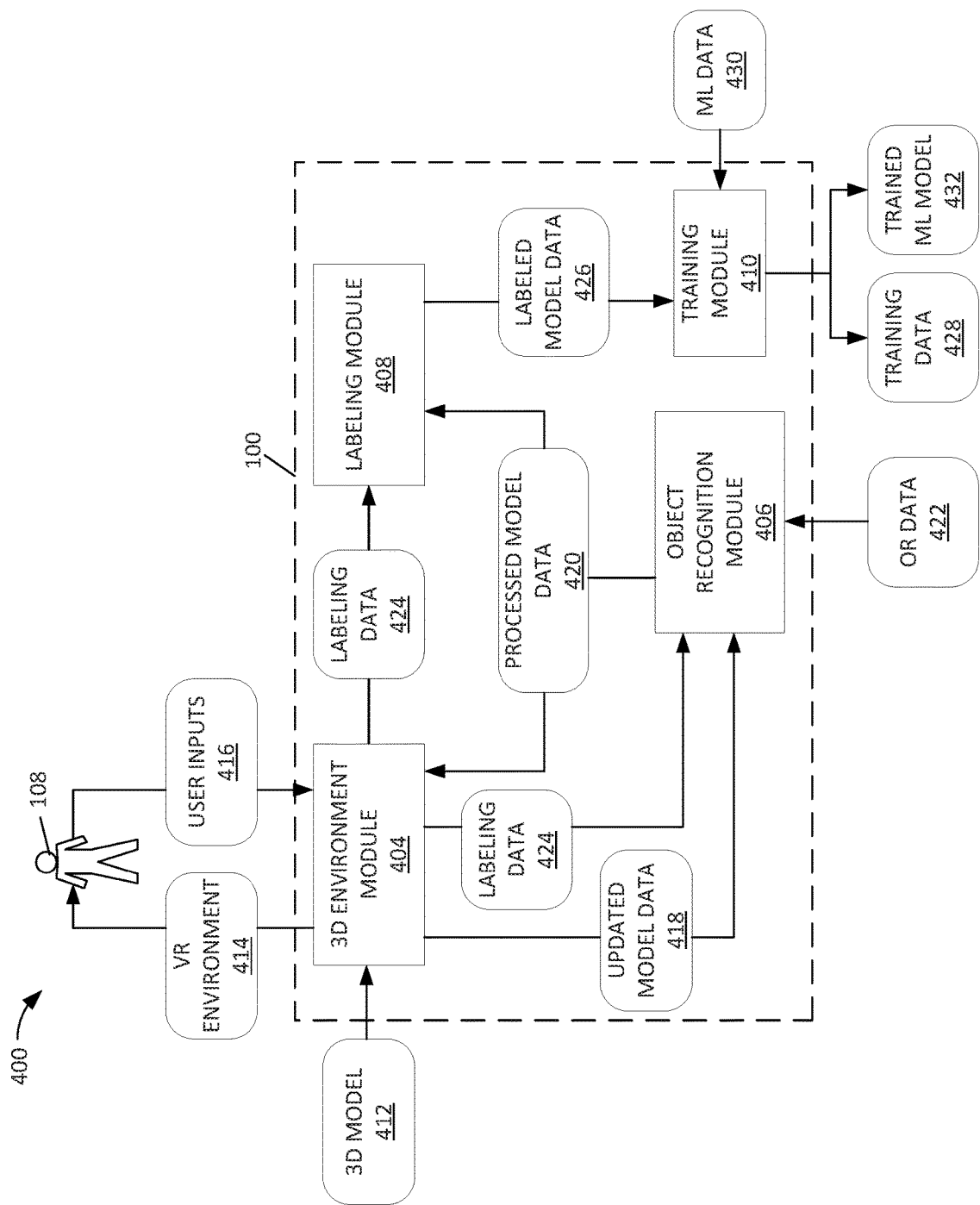
FIG. 4 illustrates an exemplary modular representation of a VR labeling computer system, such as the VR labeling computer system of FIG. 1.

FIG. 4 depicts modular representation 400 of VR labeling computer system 100. Modular representation 400 is one possible embodiment of modules and data flow within VR labeling computer system 402. In the exemplary embodiment, VR labeling computer system 402 includes 3D environment module 404, object recognition (OR) module 406, labeling module 408, and training module 410. In alternative embodiments, the above modules may be combined with each other in any combination. In the exemplary embodiment, the modules are contained within VR computing device 104 and MP computing device 102 (both shown in FIG. 1). Labeling computer system 402 may be capable of VR processing, AR processing, or both.

In an exemplary VR embodiment, 3D environment module 404 is configured to receive 3D model 412 (which may be similar to 3D model 302, shown in FIG. 3), display VR environment 414 to user 108, and receive user inputs 416 from user 108. 3D environment module 404 is further configured to transmit updated model data 418 to OR module 406 and labeling data 424 to both OR module 406 and labeling module 408. OR recognition module 406 is configured to receive updated model data 418, labeling data 424, and/or OR data, and implement object recognition on updated model data 418, labeling data 424, and/or 3D model 412. OR module 406 is further configured to transmit processed model data 420 to 3D environment module 404 and labeling module 408. Labeling module 408 is configured to receive labeling data 424 and processed model data 420, process the received data, and transmit labeled model data 426 to training module 410. Training module 410 is configured to receive labeled model data 426 and ML data 430 and generate training data 428 and/or trained ML model 432.

In the exemplary embodiment, 3D environment module 404 is configured to receive 3D model 412 from a database, such as database 202 (shown in FIG. 2). 3D model 412 includes data that is representative of a 3D environment (e.g., a point cloud, mesh model, CAD model, wireframe model, or some other model that may be represented in a 3D digital environment). 3D model 412 may further include geolocation data in the case that 3D model 412 is a representation of a real-world environment. For example, 3D model 412 may be a point cloud generated from images (e.g., a video, photos, or a 3D video) of a construction site, such that a 3D digital environment of the construction site may be rendered and viewed using a proper computing device and display device.

3D environment module 404 is configured to process 3D model 412 and transmit VR environment 414 to user 108 based upon the digital environment represented by 3D model 412. In the exemplary embodiment, 3D environment module 404 interacts with user 108 via a VR input/output device, such as the VR input/output components of VR computing device 104. In some embodiments, 3D environment module 404 is configured to convert 3D model 412 into VR environment 414. In other embodiments, 3D environment module 404 displays or renders 3D model 412 as VR environment 414 to user 108 through a VR output device. In one example, 3D environment module 404 displays a VR environment through a VR headset, where the VR environment is of a construction site represented by 3D model 412.

Figure 5:
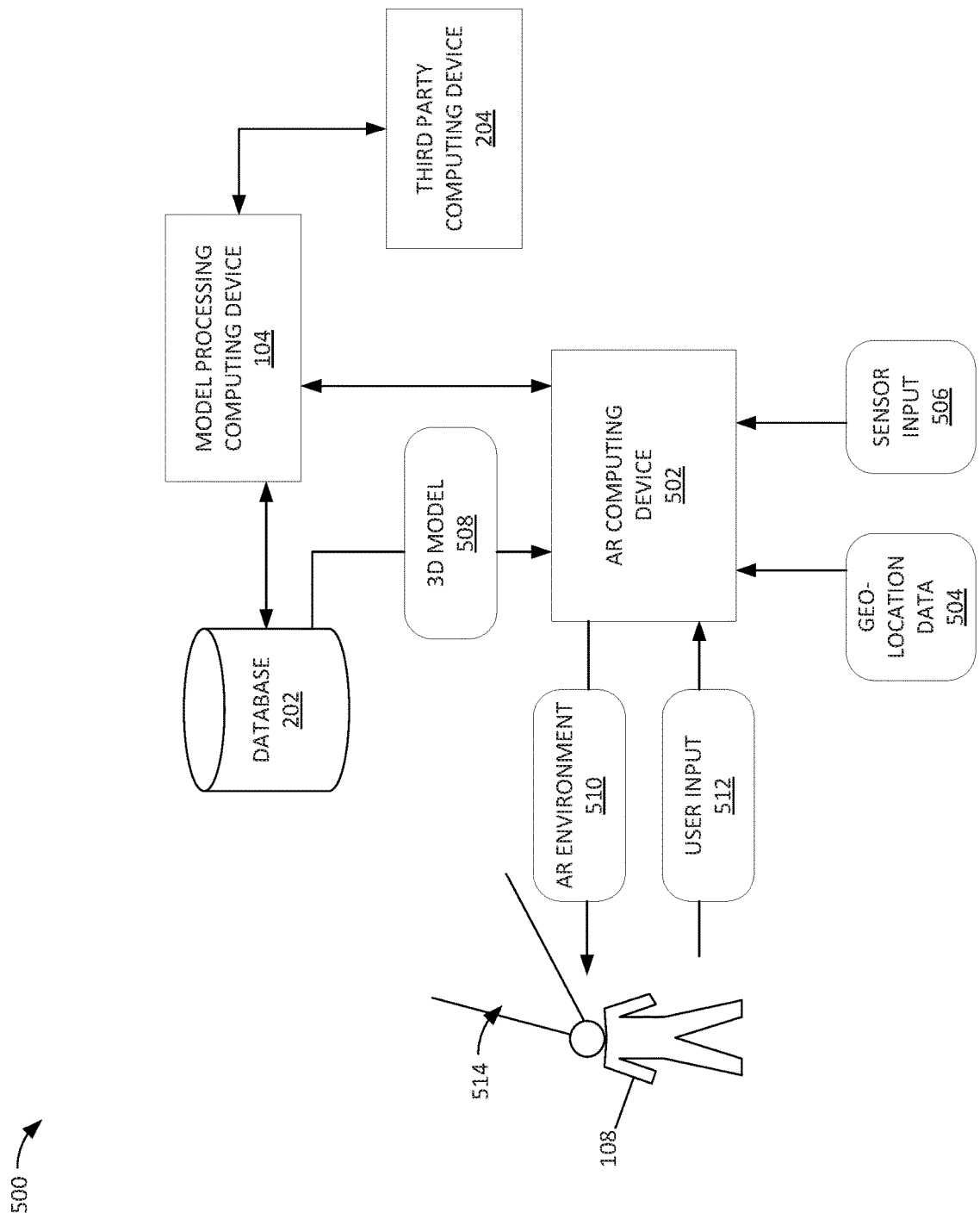
FIG. 5 illustrates an exemplary data flow in an AR embodiment of the VR labeling computer system of FIG. 1.

In an exemplary AR embodiment, 3D environment module 404 is configured to receive 3D model 412 from database 202, as well as geolocation data and sensor input from sensors and/or other input devices associated with user 108. 3D environment module 404 is configured to compare the geolocation data to the geolocation of 3D model 412 and determine that user 108 is within a certain distance of the real-world environment represented by 3D model 412. 3D environment module 404 is configured to generate an AR environment, such as VR environment 414, to user 108 based upon the geolocation data, the sensor data, and 3D model 412, as discussed in greater detail in FIG. 5.

3D environment module 404 is configured to receive user inputs 416 from user 108, wherein user inputs 108 include commands for navigating VR environment 414, adding bounding frames around environmental features, selecting identified environmental features, adding defined zones, and adding labels and/or annotations to identified environmental features. User inputs 416 may be received through a VR input device, and may include hand gestures, eye movements, text input, audio input, mouse input, and/or any other medium for receiving commands from user 108. In one example, user 108 uses keyboard inputs and hand gestures to navigate through a construction site VR environment and place bounding frames around unidentified environmental features user 108 wishes to have identified.

3D environment module 404 is further configured to generate updated model data 408 based upon user inputs 416 and 3D model 412. In the exemplary embodiment, 3D environment module 404 determines changes to 3D model 412 based upon user inputs 416 and generates updated model data 418 based upon the changes. In some embodiments, 3D environment module 404 alters 3D model 412 based upon user inputs 416 and generates updated model data 418 based upon the altered 3D model 412. That is, in some embodiments, updated model data 418 includes only changes to 3D model 412, whereas in other embodiments, updated model data 418 includes 3D model 412 with changes already incorporated into the model. For example, updated model data 418 may include bounding frames and corresponding coordinates for where the bounding frames were placed within VR environment 414. In another example, updated model data 418 may include 3D model 412 including bounding frames added by 3D environment module 404 based upon user inputs 416.

In the exemplary embodiment, OR module 406 is configured to receive updated model data 418, and OR data 422, and perform OR processing on updated model data 418 in order to identify environmental features represented in updated model data 418. In an alternative embodiment, OR module 406 receives updated model data 418 and 3D model 412 and performs OR processing on both 3D model 412 and updated model data 418. In the exemplary embodiment, OR module 406 identifies environmental features represented in updated model data 418 and generates processed model data 420 which includes the identified environmental features. In the exemplary embodiment, OR data 422 includes any data necessary for implementing OR processing on a 3D model, such as but not limited to object recognition techniques, algorithms, or engines, trained machine learning models, segmentation techniques, semantic segmentation techniques.

In particular, OR module 406 both identifies groups of data points in updated model data 418 that represent an environmental features, and denotes that those data points all belong to the same object, such as by updating or embedding meta-data for each data point. In one embodiment, OR module 406 updates the meta-data by adding a unique feature ID to the data points representing the environmental feature. In one embodiment, OR module 406 overlays a group of data points with a newly created mesh, wire frame, or surface layer representative of the environmental feature. For example, OR module 406 may receive updated model data 418 that includes bounding frames placed around buildings and trees in a construction site, and OR module 406 may identify the buildings and tress using OR processing applied to the bounding frames and/or nearby surrounding areas. After identifying the specific data points which represent the buildings and trees, OR module 406 may embed meta-data into each data point, where the meta-data indicates a unique feature ID associated with each tree or building.

In one embodiment, OR module 406 implements object recognition techniques using a trained ML model. OR module 406 may implement segmentation techniques to recognize and identify environmental features in updated model data 418. In particular, OR module 406 may implement semantic segmentation to "segment" or differentiate the points in a 3D model that are associated with a specific environmental feature or class of environmental feature. In semantic segmentation, for example, a 3D model or specific area of a 3D model (e.g., the area within a bounding frame) may be processed and every data point (e.g., pixel or surface) of the processed area may be assigned a particular feature classification.

In some embodiments, the classification assigned to each environmental feature is descriptive, such as determining that a large group of pixels represent the ground, other pixels represent man-made objects, and other pixels represent natural objects. In other embodiments, the classification assigned to each environment is non-descriptive, and merely groups like pixels with each other. In other words, pixels representing different trees may be grouped and assigned a non-descriptive label indicating that the pixels represent distinct objects, without given any information that the object might be a tree or even a natural environmental feature.

In one embodiment, OR module 406 utilizes labeling data 424 for more accurate object recognition. For example, if OR module 406 has input indicating an object within a bounding frame is a tree, OR module 406 may use that data to look for groups of pixels that have certain characteristics pertaining to a tree (e.g., green leaves, brown trunk, etc.), and thus may more accurately identify the bounds of the tree.

In the exemplary embodiment, OR module 406 generates processed model data 420 by applying object recognition to updated model data 418. In some embodiments, processed model data 420 may include identified environmental features, which are then associated with 3D model 412, such as by 3D environment module 404. For example, OR module 406 may generate objects which may be labeled and/or associated with a 3D model.

In other embodiments, OR module 406 generates processed model data 420 such that processed model data 420 is a 3D model which includes identified environmental features. For example, OR module 406 may generate processed model data that includes a 3D digital environment representing a construction site, and all the buildings in the construction site may be identified as individual environmental features. In another example, OR module 406 generates processed model data that includes data points representing identified environmental features along with the positioning of the points in a 3D digital environment, such that the identified features may later be embedded into a 3D model.

In the exemplary embodiment, OR module 406 transmits processed model data 420 to 3D environment module 404. 3D environment module 404 receives processed model data 420 and may merge identified environmental features with 3D model 412. 3D environment module 404 is further configured to display VR environment 414 to user 108, where VR environment 414 is based upon processed model data 420 and 3D model 412 (either contained within processed model data 420 or as merged with processed model data 420). 3D environment module 404 may display identified environmental features in VR environment 414 such that identified features are shaded, outlined, colored, patterned, lightened, or otherwise denotes as being an identified feature. In some embodiments, the identified features are denoted by changing a visual aspect of the data points which represent the feature. In other embodiments, additional data points, such as a surface layer, mesh layer, wire model, point cloud, etc., are overlaid on top of the data points in the 3D model, thus changing the appearance of the identified feature in the VR environment.

In some embodiments, identified environmental features are not particularly denoted in any noticeable way until user 108 selects the environmental feature. In one example, VR environment 414 may display all identified objects, such as trees, buildings, and street signs, as being shaded. In another example, identified objects such as trees, buildings, and street signs are shaded after being selected by user 108.

In the exemplary embodiment, 3D environment module 404 receives user inputs 416 indicating that user 108 wishes to select particular identified environmental features. User inputs 416 for selecting an object may include pointing at the object, hovering over the object, looking at the object (e.g., point of gaze via eye tracking), or any other user input for selecting a particular object. Once an environmental feature is selected, 3D environment module 404 is configured to receive labeling inputs from user 108 for labeling the environmental feature. In some embodiments, user 108 describes a label first, and then selects the environmental feature or features to which the label applies. 3D environment module 404 may receive labels from user 108 through any of a number of user inputs as previously described. For example, user 108 may select an identified environmental feature and label the feature as a tree. In another example, user 108 may select the label for "tree" and apply the label to a number of environmental features.

In the exemplary embodiment, 3D environment module 404 is configured to receive user inputs 416 that include labels for environmental features and generate labeling data 424. In some embodiments, 3D environment module 404 generates labeling data 424 by extracting user inputs 416 that are directed toward environmental feature labels. In other embodiments, 3D environment module 404 processes labels received through user inputs 416 into a different data type in order to generate labeling data 424. In some embodiments, 3D environment module 404 embeds or otherwise applies the labeling data to processed model data 420 and/or 3D model 412, such that the labeling data is embedded as meta data in the data points of the 3D model or the data points of an identified environmental feature.

In the exemplary embodiment, 3D environment module 404 transmits labeling data 424 to labeling module 408 for association with processed model data 420 and/or 3D model 412. In some embodiments labeling module 408 is configured to embed or otherwise apply the labeling data to processed model data 420 and/or 3D model 412, such that the labeling data is embedded as meta data in the 3D model or the data points specifically associated with an environmental feature. In other words, labeling module 408 embeds label meta-data into each data point associated with an identified environmental feature. For example, labeling module 408 may embed a label for "tree" into all the data points representing identified trees in the 3D model. In other embodiments, labeling module 408 is configured to including labeling data 424 as an additional data type included in the 3D model, such that the labeling data exists alongside the data points representing the 3D environment.

In the exemplary embodiment, labeling module 408 is configured to generate labeled model data 426 based upon applying labeling data 424 to the 3D model, such as 3D model 412 and/or processed model data 420. In the exemplary embodiment, labeled model data 426 includes labeling data 424 applied to processed model data 420, which includes 3D model 412. In other embodiments, labeled model data 426 includes just the labeled environmental features. In the exemplary embodiment, labeling module 408 is configured to transmit labeled model data 426 to training module 410. In one example, labeling module 408 applies labeling data to processed model data 420 such that all the trees are labeled as trees and all the buildings labeled as buildings, and the labeled 3D model is transmitted as labeled model data 426. In another embodiment, labeling model 408 transmits labeled model data 426 to database 202.

In the exemplary embodiment, training module 410 utilizes labeled model data 426 to generate training data 428. In some embodiments, training data 428 is the same as labeled model data 426; that is, training data 428 is a labeled 3D model. In other embodiments, training module 410 receives additional labeled model data from database 202 and aggregates multiple labeled 3D models (e.g., multiple labeled model data) to generate training data 428. In another embodiment, training module 410 generates training data 428 by capturing specific elements of labeled model data 426, and may further aggregate multiple elements into training data 428. For example, training module 410 may extract all the labeled trees from a labeled 3D model and generate "tree" training data using the extracted labeled trees. In another example, training module 410 may extract different areas of a single 3D model, such as multiple houses each containing multiple identified features (e.g., windows, doors, roofs) and aggregate the areas into "house" training data. In yet another example, training module 410 re-formats labeled model data 426 such that labeled model data 426 may be processed as training data using a machine learning algorithm. In one embodiment, training module 410 transmits training data 428 to database 202.

In the exemplary embodiment, training module 410 is further configured to generate trained ML model 432. Training module 410 is configured to receive ML data 430 from a database, such as database 202, and utilize training data 428 to train an untrained ML model, thereby generating trained ML model 432. Training module 410 may receive training data 428 from database 202, or may generate training data 428 based upon labeled model data 426 and use the generated training data 428 for training an untrained ML model. ML data 430 may include untrained ML models, partially trained models, ML methods, techniques, and/or algorithms, and any other data needed for generating a trained ML model, such as trained ML model 432. In some embodiments, training module 410 utilizes training data 428 for training trained ML model 432, where training data 428 is labeled model data 426. In other embodiments, training module 410 may generate training data 428 as described above, and utilize training data 428 for generating trained ML model 432.

Exemplary Data Flow in Augmented Reality Labeling System

FIG. 5 depicts data flow 500 in an augmented reality (AR) embodiment of VR labeling system 100 (shown in FIG. 1). The exemplary AR embodiment includes AR computing device 502, MP computing device 102, third party computing device 204, and database 202. In the exemplary embodiment, AR computing device 502 is similar to VR computing device 104 (shown in FIG. 1), but includes hardware components that allow an augmented reality experience for user 108. In some embodiments, AR computing device 502 and VR computing device 104 are the same computing device, that is, a computing device with both AR and VR capabilities that functions as described in VR labeling system 100.

AR computing device 502 is configured to receive 3D model 508 and determine a location of user 108 and field of vision 514 of user 108 based upon geo-location data 504 and sensor input 506. AR computing device 502 is further configured to display AR environment 510 to user 108, receive user input 512 from user 108, and alter 3D model 508 based upon user input 512. AR computing device 502 is further configured to communicate with MP computing device 102 and user 108 to identify and label environmental features in 3D model 508, as described in FIGS. 3 and 4.

In the exemplary embodiment, AR computing device 502 is configured to receive geolocation data 504 (e.g., GPS location data, real time kinematic location data, and low earth orbit location data) and sensor input data 506 in order to determine the location of user 108 and field of view 514 of user 108. AR computing device 502 is configured to receive 3D model 508, which may be similar to 3D models 302 and 412 (shown in FIGS. 3 and 4, respectively) from database 202, where 3D model 508 is based upon a real-world environment and is geo-referenced to that environment. 3D model 508 is geo-referenced to a real-world environment such that real-world, geographic coordinates (e.g., latitude and longitude) are assigned to 3D model 508. In some embodiments, each pixel of 3D model 508 corresponds to a real-world coordinate.

In some embodiments, the real-world coordinates are stored as meta-data in 3D model 508. For example, 3D model 508 may be generated based upon aerial images of a real-world environment, such that the pixels of 3D model 508 are assigned a particular latitude and longitude.

AR computing device 502 is configured to receive 3D model 508 from database 202 and compare geolocation data 504 to the geolocation of 3D model 508. When the geolocations match, AR computing device 502 is configured to display AR environment 510 to user 108, based upon geolocation data 504 and sensor input data 506. In some embodiments, AR computing device 502 may determine a geolocation match when the geolocation of user 108 is within a certain range of the geolocation of 3D model 508; that is, a match is determined when the geolocation of a given data point of 3D model 508 is within a certain range of geolocation data 504.

Upon determining a match between the two geolocations, AR computing device 502 is configured to display AR environment 510 to user 108 through an AR display component of AR computing device 502 (not separately shown). In the exemplary embodiment, AR computing device 502 contains an AR display device, such as AR glasses, that allows user 108 to view a real-world environment overlaid with virtual content (e.g., digital elements of a 3D model). AR computing device 502 is further configured to receive user inputs 512 from user 108 and alter 3D model 508 based upon user 108 inputs. In some embodiments, user inputs 512 include sensor input data 506, and vice versa.

In the exemplary embodiment, based upon sensor input data 506, AR computing device 502 determines field of view 514 (e.g., determines what user 108 is looking at). In one embodiment, AR computing device 502 includes cameras, lidar, sonar, or radar devices, accelerometers, gyroscopes, and/or any devices used to collect sensor input data 506 about the real-world environment near user 108. AR computing device 502 may receive sensor input data 506 that includes image data, video data, lidar data, sonar data, radar data, accelerometer data, gyroscope data, and/or any other data about user 108's environment, and may process sensor input data 506 to determine field of view 514. In one embodiment, AR computing device 502 receives sensor input data 506 that includes video of the real-world environment, in particular, video that corresponds to the field of view 514. AR computing device 502 may identify environmental features in the video data and match those environmental features to environmental features identified in 3D model 508. In another embodiment, AR computing device 502 receives geolocation data 504 and sensor input data 506 that includes gyroscope and accelerometer data. AR computing device 502 may process the geolocation data, gyroscope data, and accelerometer data to determine the location of user 108 and field of view 514, and may determine the components of 3D model 508 that corresponds to field of view 514.

In the exemplary embodiment, AR computing device 502 determines field of view 514, and determines which data points and/or environmental features of 3D model 508 appear within field of view 514. AR computing device 502 is configured to display AR environment 510 to user 108 based upon how field of view 514 corresponds to 3D model 508. In other words, AR computing device 502 displays the virtual content of 3D model 508 that correspond to the real-world environment within field of view 514. In the exemplary embodiment, AR computing device 102 is configured to display AR environment 510 such that the 3D digital environment represented by 3D model 508 overlays the real-world environment in field of view 514.

In some embodiments, AR environment 510 only includes particular elements of 3D model 508. For example, AR computing device 502 may display only identified environmental features overlaying their real-world counterparts.

In the exemplary embodiment, 3D model 508 is unlabeled and includes only unidentified environmental features. In other words, 3D model 508 includes only unlabeled, unidentified data points. AR computing device 102 displays AR environment 510 to user 108 such that AR environment 510 overlays components of 3D model 508 onto the corresponding real-world environment based field of vision 514 of user 108. AR computing device 502 is further configured to receive user inputs 512 from user 108 and alter 3D model 508 based upon user inputs 512. User inputs 512 may include instructions for adding a bounding frame around an area or an unidentified environmental feature in AR environment 510, labeling an identified environmental feature, changing display options of AR environment 510, or any other instruction from user 108. User inputs 512 may be received through any combination of hand gestures, eye movements, spoken or audio commands, text inputs, mouse inputs, keyboard inputs, touchscreen inputs, and/or any other user inputs. AR computing device 502 is further configured to display other virtual elements not directly related to 3D model 508, such as virtual elements associated with user inputs 512 (e.g., bounding frames, hand gestures, and other illustrations of user inputs) and menu or other display data (e.g., menus, buttons, toolbars, or other controls).

Similar to the VR labeling computer systems as described in FIGS. 3 and 4, AR computing device 502 is configured to communicate with MP computing device 102 to generate 3D models with identified, labeled environmental features (e.g., labeled 3D model 314 or labeled model data 426). Specifically, AR computing device is configured to receive user inputs 512 from user 108, generate updated model data (e.g., updated 3D model 308 or updated model data 418) based upon user inputs 512, and transmit the updated model data to MP computing device 102. MP computing device 102 is configured to implement object recognition processing on the updated model data, generate processed model data (e.g., processed 3D model 312 or processed model data 420), and transmit the processed model data to AR computing device 502.

AR computing device 502 is configured to display AR environment 510 to user 108 based upon the processed model data, receive additional user input 512 including labeling inputs (e.g., labeling data 424), and generate a labeled 3D model (e.g., labeled 3D model 314 or labeled model data 426). AR computing device is further configured to transmit the labeled 3D model to MP computing device 102, which then generates training data (e.g., training data 316 or training data 428) and/or a trained ML model (e.g., trained model 320 or trained model 432) and transmits the training data and/or trained ML model to third party computing device 204.

In the exemplary embodiment, AR computing device 502 may generate and display AR environment 510 based upon any labeled or unlabeled 3D model with identified or unidentified environmental features. In one example, user 108 visits a construction site with a corresponding 3D model that includes identified and labeled environmental features. AR computing device 502 may display the identified, labeled environmental features to user 108 such that the features are lightly shaded or the labels appear on screen to user 108. User 108 may then manipulate the identified features and/or labels in order to fine tune the 3D model by comparing it directly to the real-world environment on which the 3D model is based.

In one embodiment, AR computing device 502 allows user 108 to simultaneously switch between AR and VR environments, such that user 108 may be viewing AR environment 510 and switch to a VR environment (e.g., VR environment 304), or vice versa. AR computing device 502 may seamlessly switch between displaying AR and VR environments to user 108 based upon user inputs 512, or some other external factor, such as a change in geolocation data 504 or sensor input data 506. In one example, user 108 is viewing a neighborhood in AR environment 510, such that the physical houses in the neighborhood are overlaid with identified houses in 3D model 508. User 108 may desire to see the backside of a house without walking behind the house, so user 108 inputs a command to navigate the view of the digital environment away from user 108's real-world position, causing AR computing device 502 and MP computing device 104 to transition user 108 out of AR environment 510 and into a VR environment. In another example, user 108 may be experiencing a VR environment, and upon sensing a change in user 108's geolocation, AR computing device 502 may prompt user 108 that an AR environment interaction is possible, and give user 108 the option to switch over to the AR environment.

Exemplary VR View and VR Functionality

Figure 6:
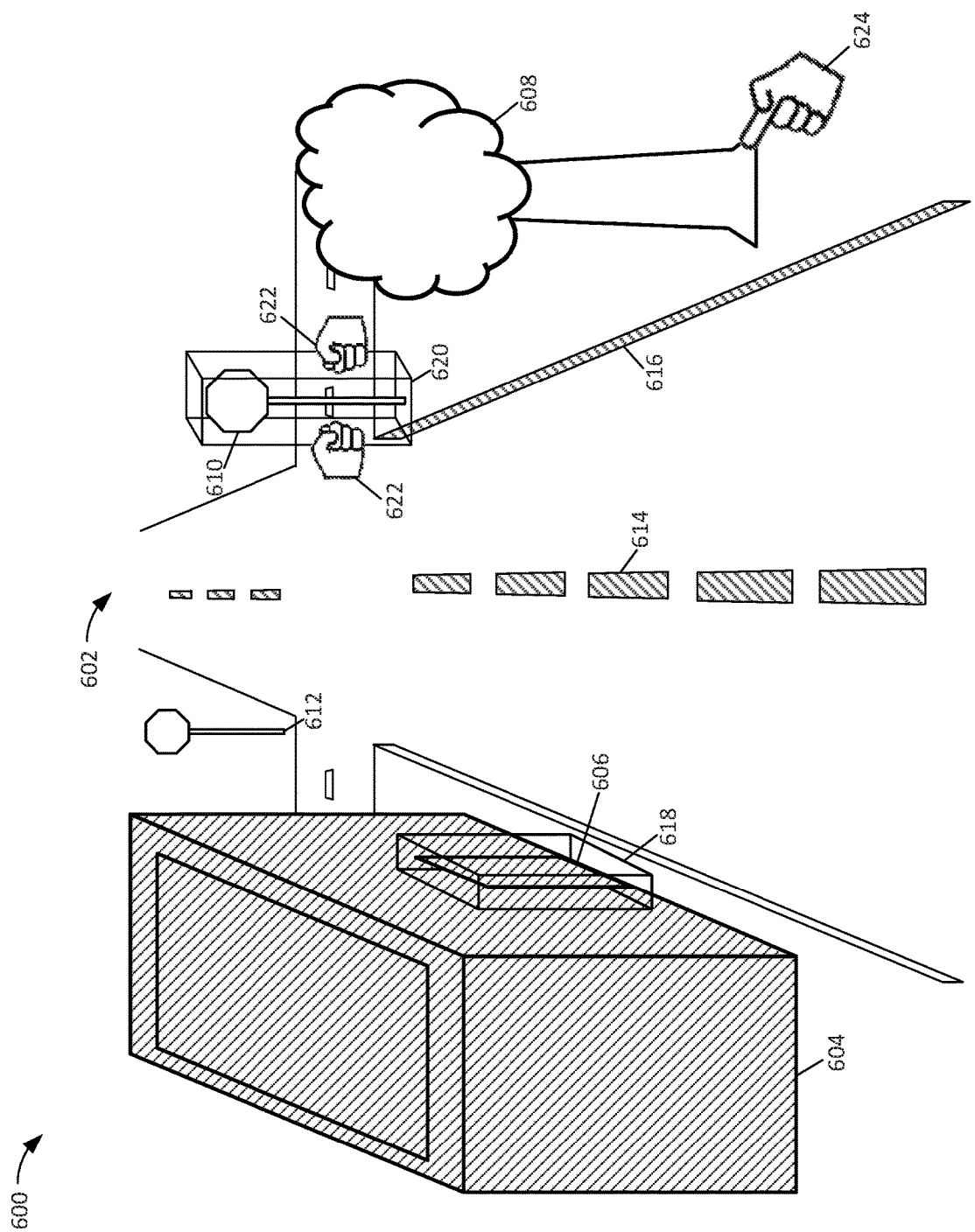
FIG. 6 illustrates an exemplary VR view, such as one displayed by the VR labeling computer system of FIG. 1.

FIG. 6 depicts exemplary view 600 of VR environment 602, displayed by a VR computing device (e.g., VR computing device 104, shown in FIG. 1). VR view 600 is a snapshot of VR environment 602. In the exemplary embodiment, VR computing device 104 renders a 3D model (e.g., 3D models 302, 412, and 508, shown in FIGS. 3, 4, and 5 respectively) as VR environment 602. User 108 may interact with VR environment 602 through VR computing device 104, for example, by issuing user inputs (e.g., user input 306, 416, and 512, shown in FIGS. 3, 4, and 5 respectively) such as selecting environmental features, navigating through VR environment 602, applying bounding frames, creating defined zones, and applying labels and/or annotations to identified environmental features.

VR environment 602 includes environmental features such as building 604, door 606, tree 608, street signs 610 and 612, lane markings 614, and curb 616. Some of the environmental features, such as building 604, tree 608, lane markings 614, and curb 616 may be identified environmental features. For example, the environmental features may have been identified using object recognition or manually by user 108. Other environmental features, such as street signs 610 and 612 may be unidentified environmental features. For example, unidentified environmental features may consist of data points that, when displayed in VR environment 602, appear to be environmental features, but that contain no specific data indicating the group of data points makes up a particular environmental feature. VR environment 602 further includes bounding frames 618 and 620, as well as gesture icons 622 and 624.

In the exemplary embodiment, the data points of a 3D model are rendered and displayed by a VR computing device as VR environment 602. Environmental features, such as building 604, tree 608, lane markings 614, and curb 616 may be identified environmental features in the 3D model. Identified environmental features may be selectable by user 108 interacting with VR environment 602. In the exemplary embodiment, some identified environmental features, particularly building 604, lane markings 614, and curb 616 are displayed as shaded to visually indicate to user 108 that the features are identified as individual features (e.g., discrete from the remaining data points of VR environment 612). Some identified environmental features, such as tree 608, may be identified but not shaded or otherwise visually indicated to be an identified feature.

In some embodiments, identified environmental features include additional data points indicating the feature, such as a surface mesh, wire model, additional data points, or constructed objects. For example, data points representing a tree may be identified, and, rather than identifying the tree by updating the meta-data of the data points, a surface mesh representing the tree is generated to overlay the data points representing the tree. In other embodiments, the data points of the 3D model also include meta-data (e.g., a unique feature ID and/or feature classification. Identified environmental features may be selected by user 108, while unidentified environmental features, such as street signs 610 and 612, are un-selectable.

User 108 may interact with VR environment 602 through user inputs, such as hand gestures, eye movements, and/or any other user inputs as described above. In the exemplary embodiment, user 108 interacts with VR environment 602 through hand gestures, as represented by gesture icons 622 and 624. In one embodiment, user 108 points to tree 608, represented by gesture icon 624, and VR computing device 104 receives user 108 input selection of tree 608. VR computing device 104 may highlight tree 608, outline tree 608, or otherwise indicate that tree 608 is selected after receiving user 108 input. In another embodiment, user 108 places a bounding frame using a hand gesture, such as bounding frame 620 placed by hand gestures 622. User 108 may use a hand gesture to "grab" the bounding frame (e.g., make a first around the object as indicated by gesture 622), and user 108 may be able to further move the bounding frame around VR environment 602 while the bounding frame is "held". Additionally, user 108 may grab another side of the bounding frame and re-size the bounding frame by pulling it apart or pushing it together. In a similar manner, user 108 may rotate or re-orient the bounding frame. In other embodiments, different hand gestures or different user inputs may be used to set, move, resize, and/or re-orient bounding frame.

In the exemplary embodiment, user 108 may create and place bounding frames around unidentified environmental features to provide a boundary within which object recognition techniques may be applied for identifying a feature contained within the boundary. In other embodiments, users may create bounding frames to define an area in VR environment 602 and/or to define a boundary around an environmental feature. For example, user 108 may place bounding frame 620 around street sign 610. During object recognition processing, the bounding frame acts as a guide indicating a region in the 3D model within which an unidentified object is contained. Object recognition may be processed more accurately and quickly within defined areas. As such, limiting object recognition processing to the region defined by bounding frame 620 may improve the ability of the VR labeling system to identify street sign 610.

Bounding frames may also be used to indicate smaller features contained within or adjacent to larger features. For example, bounding frame 618 has been placed around door 606, which is an unidentified environmental feature contained within building 604. Even though building 604 has already been identified, in subsequent object recognition processing, bounding frame 618 acts as an indicator that another environmental feature, discrete from building 604, lies within bounding frame 618. Thus, door 606 may be more readily identified.

Exemplary VR View and VR Functionality

Figure 7:
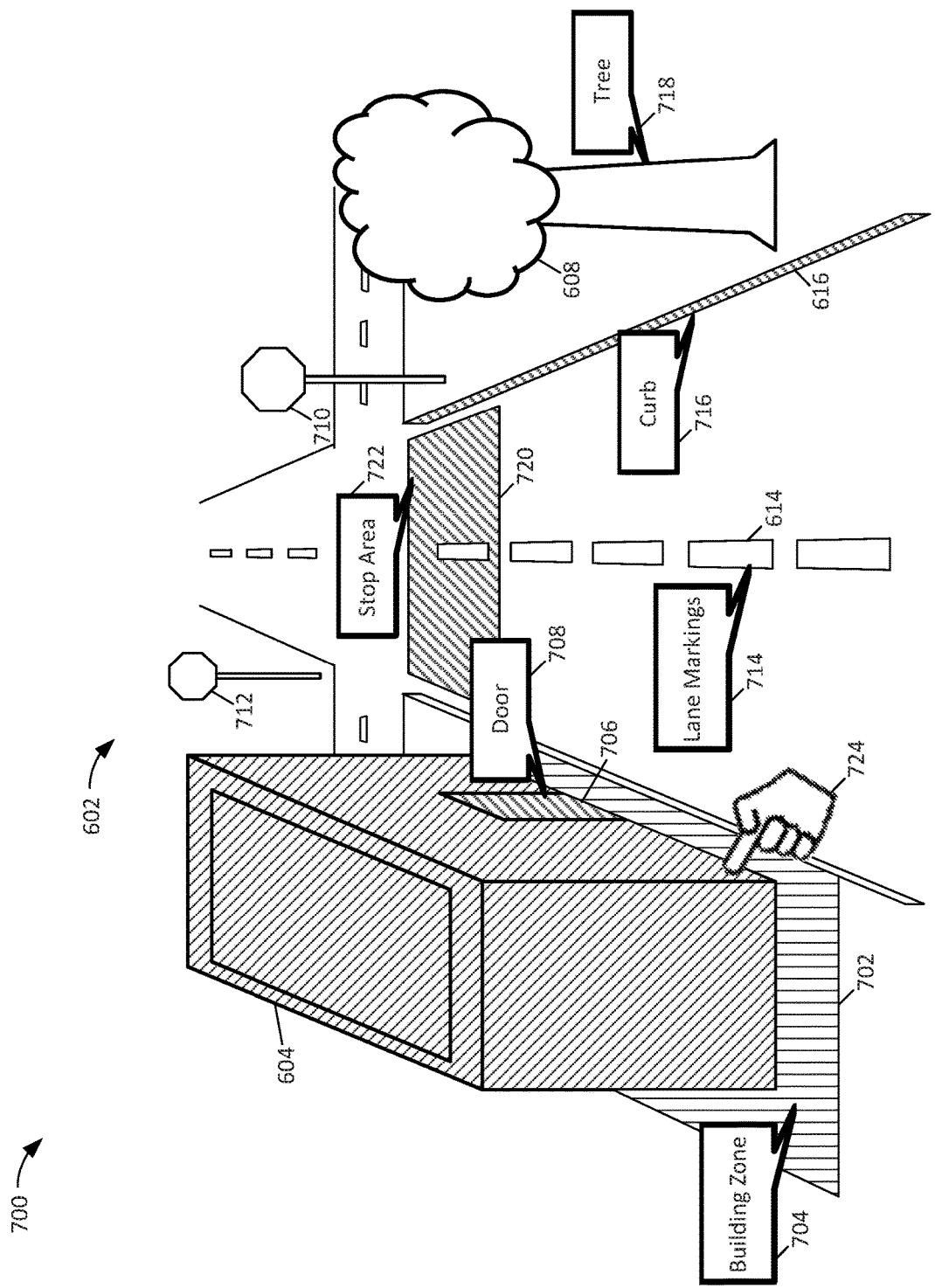
FIG. 7 illustrates another exemplary VR view, such as one displayed by the VR labeling computer system of FIG. 1.

FIG. 7 depicts exemplary view 700 of VR environment 602, displayed by a VR computing device (e.g., VR computing device 104, shown in FIG. 1). VR view 700 is a snapshot of VR environment 602. In the exemplary embodiment, VR computing device 104 renders a 3D model (e.g., 3D models 302, 412, and 508, shown in FIGS. 3, 4, and 5 respectively) as VR environment 602. User 108 may interact with VR environment 602 through VR computing device 104, for example, by issuing user inputs (e.g., user input 306, 416, and 512, shown in FIGS. 3, 4, and 5 respectively) such as selecting environmental features, navigating through VR environment 602, applying bounding frames, creating defined zones, and applying labels and/or annotations to identified environmental features.

VR view 700 includes environmental features such as building 604, tree 608, lane markings 614, curb 616, building zone 702, door 706, street sign 710, street sign 712, and stop area 720. VR view 700 further includes feature labels such as building zone label 704, door label 708, lane markings label 714, curb label 716, tree label 718, and stop area label 722. VR view 700 further includes hand gesture representation 724.

In the exemplary embodiment, VR view 700 depicts VR environment 602 after object recognition and feature labeling have been applied to the 3D model on which VR environment 602 is based. VR view 700 depicts many of the same environmental features as VR view 600 (shown in FIG. 6), but VR view 700 includes additional features, such as building zone 702 and stop area 720, more identified features, such as door 706 and street signs 710 and 712, as well as numerous feature labels. In the exemplary embodiment, the bounding frames placed around street sign representation 610 and door representation 606 in VR view 600 (shown in FIG. 6), allowed object recognition techniques to identify street sign 710 and door 706. Additionally, street sign 712 was identified from street sign representation 612 (shown in FIG. 6).

In addition to the newly identified environmental features, VR view 700 contains building zone 702 and stop area 720, both of which are user-defined environmental features. As described, user 108 may utilize bounding frames or other inputs for defining boundaries around objects and/or areas within VR environment 602. For example, user 108 may define building zone 702 by creating a perimeter a specific distance from building 604. User 108 may further input labels and/or annotations to describe why the zone was defined.

In some embodiments, user 108 may set rules for a given zone. For example, stop area 720 may be defined by user 108 and a rule may be set indicating that vehicles entering the zone should stop. In some embodiments, stop area 720 may be automatically defined by a VR computing device or an MP computing device based upon environmental features, such as street sign 710. An MP computing device may determine, for example, that street sign 710 represents a stop sign, either based upon a specific user-defined label or not, and further generate stop area 720 indicating an area in which a car should stop based upon street sign 710.

VR view 700 also includes feature labels associated with various environmental features. In some embodiments, feature labels are displayed to user 108, as shown by labels 704, 708, 714, 716, 718, and 722. In some embodiments, identified features may be labeled without the label being displayed in VR environment 602.

In the exemplary embodiment, upon user selection of a particular labeled feature, the label is displayed on screen. For example, when user 108 points to building 604 as indicated by gesture icon 724, the label associated with building 604 may be displayed. In some embodiments, the label displays directly within VR environment 602, as shown in VR view 700. In other embodiments, the label displays on a display area or display screen separate from VR view 700.

In the exemplary embodiment, the labels also include annotations, such that user 108 may label a feature based upon a category the feature falls within (e.g., "tree", "building", "lane markings") and add further annotations included in the label (e.g., "building to be demolished" or "no additional structures built within 20 feet of this building").

Exemplary VR View and VR Functionality

Figure 8:
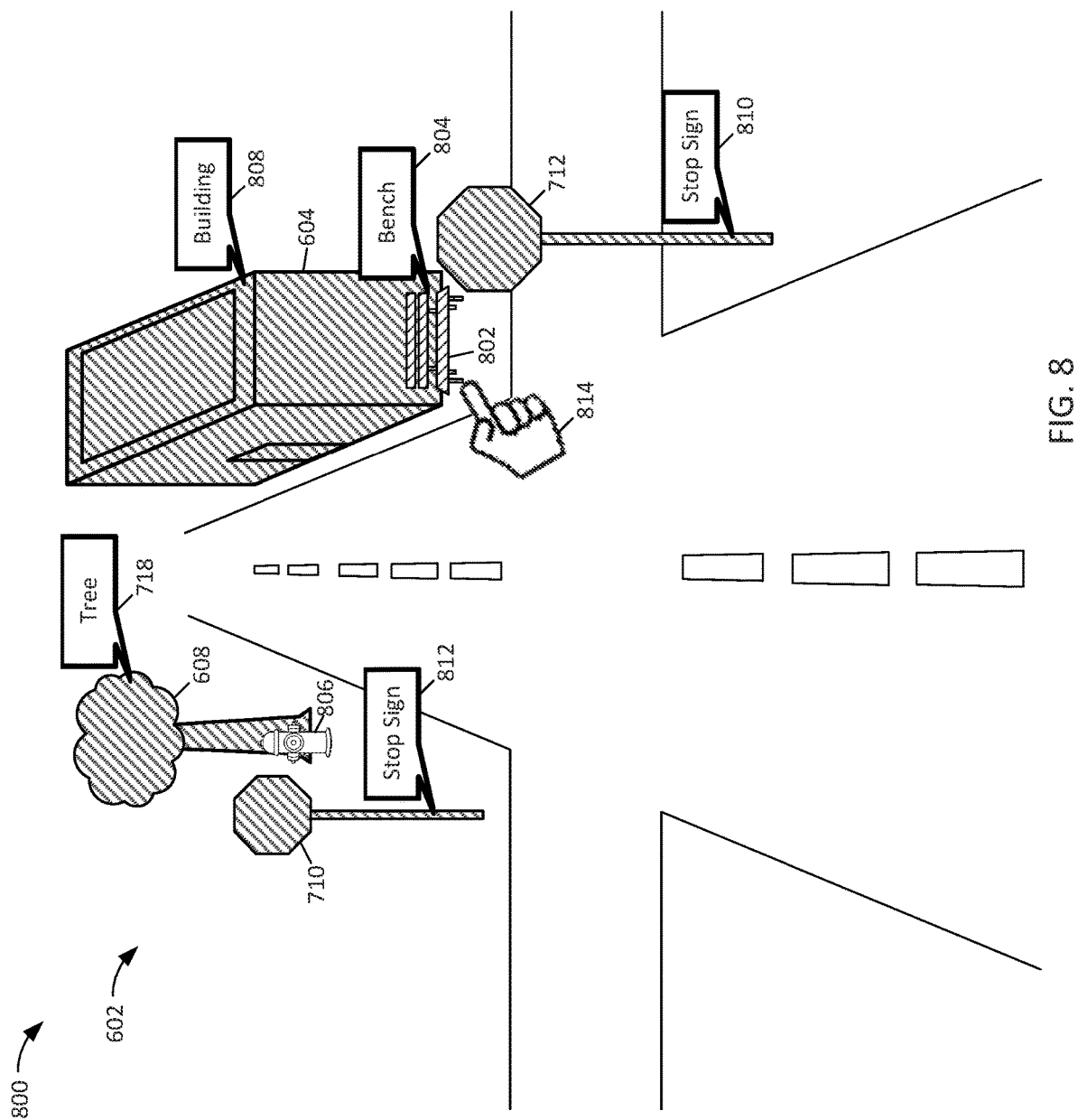
FIG. 8 illustrates another exemplary VR view, such as one displayed by the VR labeling computer system of FIG. 1.

FIG. 8 depicts exemplary view 800 of VR environment 602, displayed by a VR computing device (e.g., VR computing device 104, shown in FIG. 1). VR view 800 is a snapshot of VR environment 602. In the exemplary embodiment, VR computing device 104 renders a 3D model (e.g., 3D models 302, 412, and 508, shown in FIGS. 3, 4, and 5 respectively) as VR environment 602. User 108 may interact with VR environment 602 through VR computing device 104, for example, by issuing user inputs (e.g., user input 306, 416, and 512, shown in FIGS. 3, 4, and 5 respectively) such as selecting environmental features, navigating through VR environment 602, applying bounding frames, creating defined zones, and applying labels and/or annotations to identified environmental features.

VR view 800 depicts VR environment 602 from a different location and orientation as compared to VR views 600 and 700 (shown in FIGS. 6 and 7). VR view 800 may be achieved by user 108 who has navigated through VR environment 602 with user inputs. In the exemplary embodiment, user 108 may navigate through VR environment 602 to view a new perspective of VR environment 602, for the purpose of seeing behind objects for example.

VR view 800 contains building 604, tree 608, street sign 710, and street sign 712, all of which were displayed in the view shown in VR view 700. VR view 800 additionally contains man-made object 802 and man-made object representation 806, both of which were out of user 108's line of sight in VR views 600 and 700 (e.g., they were behind other objects). In the exemplary embodiment, a VR computing device is configured to seamlessly communicate with an MP computing device to send model updates and labeling data and receive processed model data in return.

In one example, when user 108 navigates to a new view, such as display 800, man-made object 802 is rendered and automatically identified as an environmental feature by the VR labeling computer system. In one embodiment, when new data points in a 3D model are rendered in an AR or VR environment, such as man-made object 802, they're automatically processed using object recognition to identify any potential environmental features.

In another embodiment, an unidentified environmental feature may be quickly identified by being pointed at by user 108, rather than requiring outlining with a bounding frame. For example, man-made object 802 may have been identified when user 108 pointed toward the group of data points that represented the unidentified environmental feature, as represented by gesture icon 814.

In another embodiment, when new data points are rendered, no objects are identified, such as man-made object representation 806. In the exemplary embodiment, unidentified environmental features that remain unidentified after being rendered in an AR or VR environment and after being pointed at may require more accurate boundary definition (e.g., using a bounding frame) for object recognition.

Exemplary VR View and VR Functionality

Figure 9:
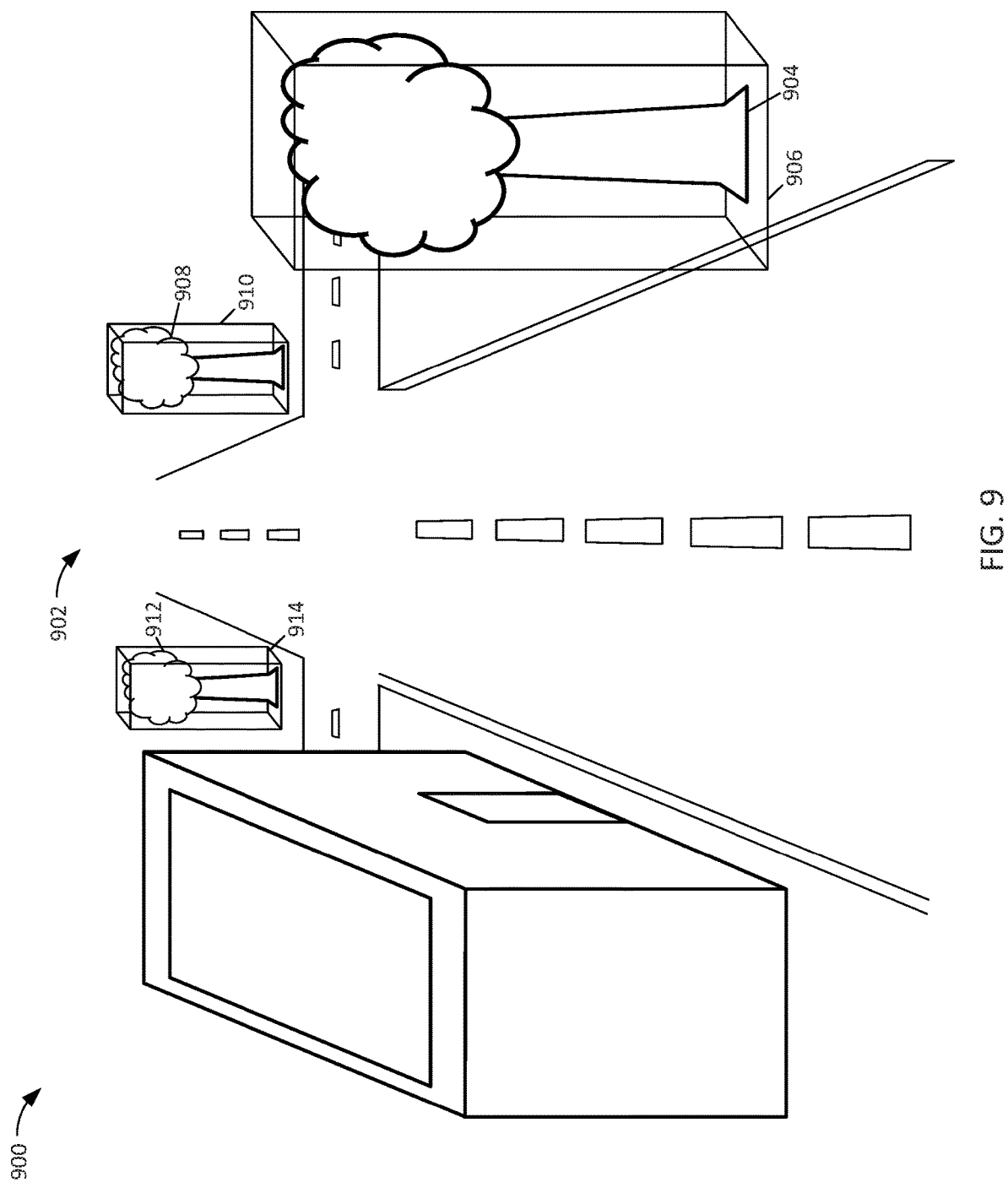
FIG. 9 illustrates another exemplary VR view, such as one displayed by the VR labeling computer system of FIG. 1.

FIG. 9 depicts exemplary view 900 of VR environment 902, displayed by a VR computing device (e.g., VR computing device 104, shown in FIG. 1). VR view 900 is a snapshot of VR environment 902. In the exemplary embodiment, VR computing device 104 renders a 3D model (e.g., 3D models 302, 412, and 508, shown in FIGS. 3, 4, and 5 respectively) as VR environment 902. User 108 may interact with VR environment 902 through VR computing device 104, for example, by issuing user inputs (e.g., user input 306, 416, and 512, shown in FIGS. 3, 4, and 5 respectively) such as selecting environmental features, navigating through VR environment 902, applying bounding frames, creating defined zones, and applying labels and/or annotations to identified environmental features.

In one embodiment, a VR labeling computer system facilitates mass feature identification and labeling. In the example embodiment, user 108 may select simultaneous feature identification and labeling and be prompted to point out or bound objects with a certain label. For example, as shown in VR view 900, user 108 may select to identify and label the trees within VR environment 902. User 108 may then place bounding frames, such as bounding frames 906, 910, and 914, around representations of trees, such as trees 904, 908, and 912. The VR labeling system (e.g., a VR computing device in communication with an MP computing device) is configured to identify the data points which represent the tree using object recognition and label the newly identified feature as a tree.

In another embodiment, user 108 selects an option to identify and label trees within the 3D environment, and points to all the groups of data points which represent trees. In yet another embodiment, user 108 selects an option to identify and label all trees, and the system is configured to make a first pass at identifying all objects within the digital environment that might be trees, and user 108 is able to modify identifications made by the system.

In one embodiment, indicating an unidentified object's label prior to utilizing object recognition to identify the object may actually increase the accuracy of the object recognition. For example, if an object recognition engine has input indicating that an object within a bounding frame is a tree, the engine may use that data to look for groups of pixels that have certain characteristics pertaining to a tree (e.g., green leaves, brown trunk, etc.), and thus may more accurately identify the bounds of the tree.

Exemplary AR Display and AR Functionality

Figure 10:
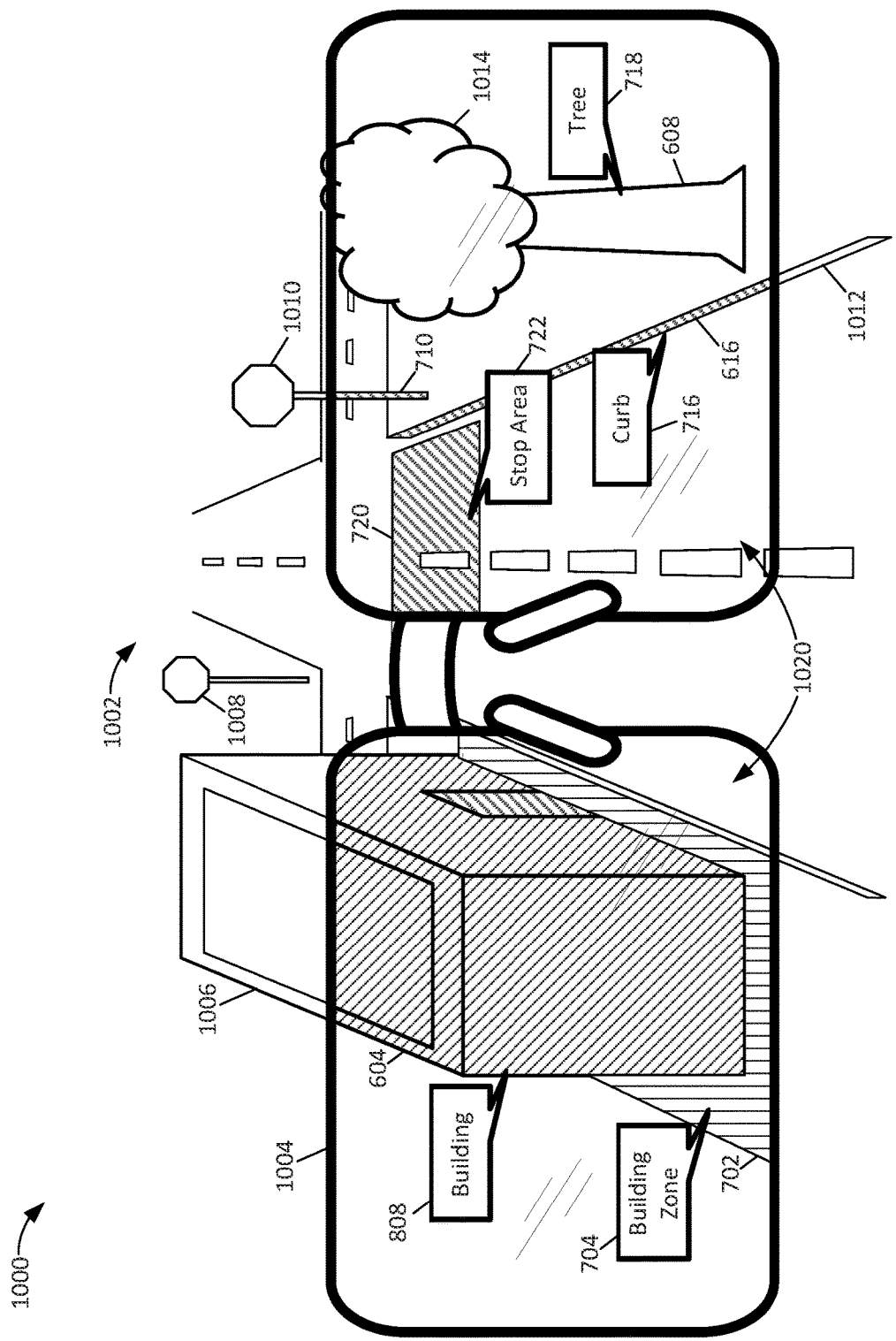
FIG. 10 illustrates another exemplary AR display, such as one displayed by the VR labeling computer system of FIG. 1.

FIG. 10 depicts exemplary AR view 1000 of a real-world environment 1002 in conjunction with AR environment 1020, displayed by a VR computing device (e.g., VR computing device 104 or AR computing device 502, shown in FIGS. 1 and 5 respectively). AR view 1000 illustrates real-world environment 1002 overlaid with AR environment 1020 as user 108 views AR environment 1020 through wearable AR display device 1004. User 108 may interact with AR environment 1020 through AR display device 1004, for example, by issuing user inputs (e.g., user input 306, 416, and 512, shown in FIGS. 3, 4, and 5 respectively) such as selecting environmental features, navigating through AR environment 1020, applying bounding frames, creating defined zones, and applying labels and/or annotations to identified environmental features. In the exemplary embodiment, AR environment 1020 is based upon a 3D model (e.g., 3D models 302, 412, and 508, shown in FIGS. 3, 4, and 5 respectively).

AR view 1000 depicts the perspective of user 108 in real-world environment 1002 on which AR environment 1020 is based. User 108 interacts with AR environment 1020 through AR display device 1004, which in the current embodiment, is a pair of glasses worn by user 108. The lenses of the glasses are used to display virtual content of AR environment 1020 overlaid on real-world environment 1002. As described above (e.g., FIG. 5), VR computing device 104 is configured to determine what objects and/or areas user 108 is looking at and overlay user 108's view with the digital representations of those objects and/or areas, labels, icons, gestures, and such.

In the exemplary embodiment, AR display device 1004 is a component of a VR computing device, such as VR computing device 104, and allows user 108 to view and interact with AR environment 1020. AR display device 1004 is configured to display digital representations of environmental features overlaid onto the physical features on which the digital features are based. For example, building 604 is overlaid on physical building 1006, street sign 710 is overlaid on physical street sign 1010, and curb 616 is overlaid on physical curb 1012. In the exemplary embodiment, some identified environmental features are shaded, thus when overlaid on their physical counterparts create a noticeable change in the look of the physical feature, such as building 604, street sign 710, and curb 616. Other identified environmental features may not be shaded, such as tree 608 overlaid on physical tree 1014. Physical features of the real-world environment that are not viewed through AR display device 1004, such as a portion of physical building 1006, a portion of street sign 1010, and street sign 1008, will have no accompanying digital overlay.

In some embodiments, AR display device 1004 may be configured to display digital representations of user-defined features that don't have a physical counterpart, such as building zone 702 and stop area 720. In some embodiments, AR display device 1004 displays building zone 702 in relation to physical building 1006. In other embodiments, AR display device 1004 displays building zone 702 based upon its location in AR environment 1020, effectively overlaying building zone 702 on the ground. Similarly, stop area 722 may be displayed in relation to physical street sign 1010, or may be overlaid on the ground based upon its location in AR environment 1020.

In the exemplary embodiment, AR display device 1004 is further configured to display feature labels, such as labels 704, 808, 716, 722, and 718. Labels may be displayed as overlaying the real-world environment and may be displayed as pointing to or otherwise associated with their corresponding digital feature. In other embodiments, labels are displayed in a separate display screen or window, such as within an additional display area near the outer boundaries of AR display device 1004. In the exemplary embodiment, labels are displayed when the corresponding environmental feature is selected, such as by pointing at the environmental feature, and labels may be turned off when the environmental feature is deselected. Additionally, user 108 may be able to select a display mode where all labels are displayed or not.

In one example, AR environment 1020 has been previously processed using object recognition and labels have been applied to identified environmental features prior to user 108 visiting real-world environment 1002. In such an example, user 108 may physically visit a location, such as real-world environment 1002, to verify the accuracy of AR environment 1020. AR display device 1004 is further configured to allow user 108 to adjust identified features, labels, or other aspects of AR environment 1020 to better represent real-world environment 1002.

In one embodiment, user 108 may determine that the data points identified as a digital environmental feature might not map to the physical feature, and user 108 is able to adjust the data points of the identified environmental feature to more accurately represent the physical feature. For example, user 108 may notice that building 604 contains data points that don't actually represent physical building 1006 (e.g., the object recognition captured additional data points, such as a nearby structure, and identified those data points as belonging to building 604).

User 108 may adjust the identified environmental feature to more accurately match the physical feature. For example, user 108 may create a removal bounding frame, such that data points in a selected area will be de-coupled from an identified feature and the meta-data indicating the identified feature will be removed from the data points. In another example, user 108 may adjust a surface mesh or surface data points by dragging, moving, or otherwise manipulating vertices associated with the mesh. In this way, user 108 may actually re-orient, re-size, and re-distribute the identified environmental feature itself, or the data points associated with the identified environmental feature.

Exemplary AR Display and AR Functionality

Figure 11:
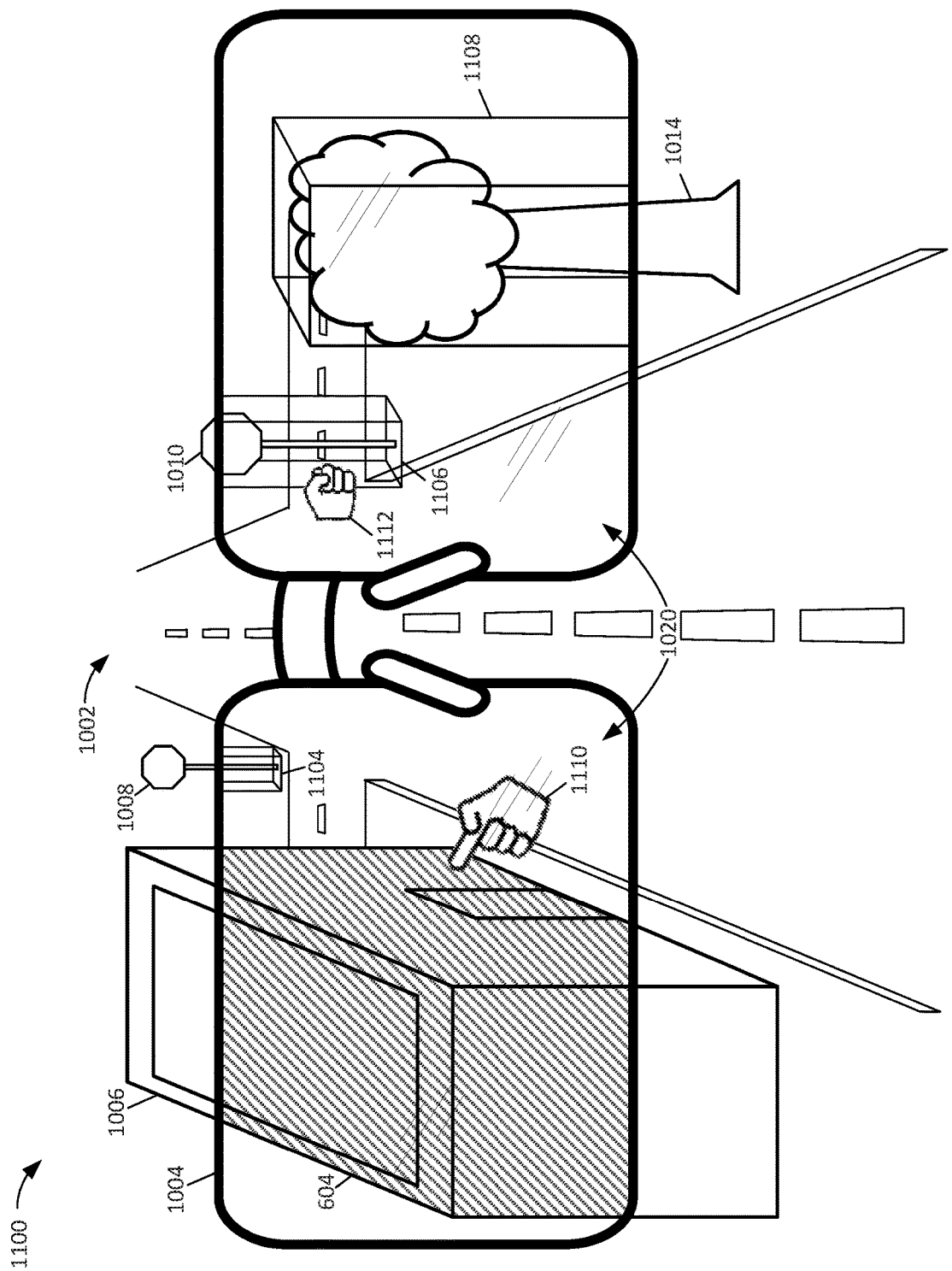
FIG. 11 illustrates another exemplary AR display, such as one displayed by the VR labeling computer system of FIG. 1.

FIG. 11 depicts exemplary AR view 1100 of a real-world environment 1002 in conjunction with AR environment 1020, displayed by a VR computing device (e.g., VR computing device 104 or AR computing device 502, shown in FIGS. 1 and 5 respectively). AR view 1100 illustrates real-world environment 1002 overlaid with AR environment 1020 as user 108 views AR environment 1020 through wearable AR display device 1004. User 108 may interact with AR environment 1020 through AR display device 1004, for example, by issuing user inputs (e.g., user input 306, 416, and 512, shown in FIGS. 3, 4, and 5 respectively) such as selecting environmental features, navigating through AR environment 1020, applying bounding frames, creating defined zones, and applying labels and/or annotations to identified environmental features. In the exemplary embodiment, AR environment 1020 is based upon a 3D model (e.g., 3D models 302, 412, and 508, shown in FIGS. 3, 4, and 5 respectively).

AR view 1100 depicts the perspective of user 108 in real-world environment 1002 on which digital environment 1020 is based. User 108 interacts with AR environment 1020 through AR display device 1004, which in the current embodiment, is a pair of glasses worn by user 108. The lenses of the glasses are used to display AR environment 1020 overlaid on real-world environment 1002. As described above (e.g., FIG. 5), VR computing device 104 is configured to determine what objects and/or areas user 108 is looking at and overlay user 108's view with the digital representations of those objects and/or areas.

AR view 1100 displays an example in which a minimal amount of object recognition and labeling have been applied to AR environment 1020. In contrast to the example depicted in AR view 1000, where user 108 may wish to verify the identified objects and labels of a digital environment by traveling to the physical location, the present example of AR view 1100 depicts user 108 adjusting and labeling AR environment 1020 while at physical location 1002.

AR view 1100 includes identified building 604, physical building 1006, bounding frames 1104, 1106, and 1108, physical street signs 1008 and 1010, physical tree 1014, and hand gestures 1110 and 1112. In the exemplary embodiment, user 108 may place bounding frames, such as bounding frames 1104, 1106, and 1108 around physical features user 108 wishes to have identified in AR environment 1020. As described in FIG. 6, user 108 may place bounding frames using a clenched first hand gesture, as depicted by hand gesture 1112. In an AR embodiment of a VR labeling computer system, such as that depicted in AR view 1100, hand gestures 1110 and 1112 depict the physical hands of user 108, rather than simple depicting digital representations of the movements of user 108's hands. In some AR embodiments, digital representations of user 108's hand gestures are also used or overlaid on user 108's physical hands.

In the exemplary embodiment, user 108 is also able to select an object by pointing toward the object, as shown by hand gesture 1110. By pointing at physical building 1006, identified building 604 may be overlaid on physical building 1006. In some embodiments, building 604 had already been identified, and pointing at physical building 1006 causes the system to overlay the digital object on the physical object. In other embodiments, pointing at physical building 1006 causes the system to process certain data points using object recognition and identify building 604. In yet another example, physical building 1006 is overlaid with data points represented unidentified the unidentified building, and pointing at those data points causes the system to implement object recognition techniques.

Exemplary User Computing Device Configuration

Figure 12:
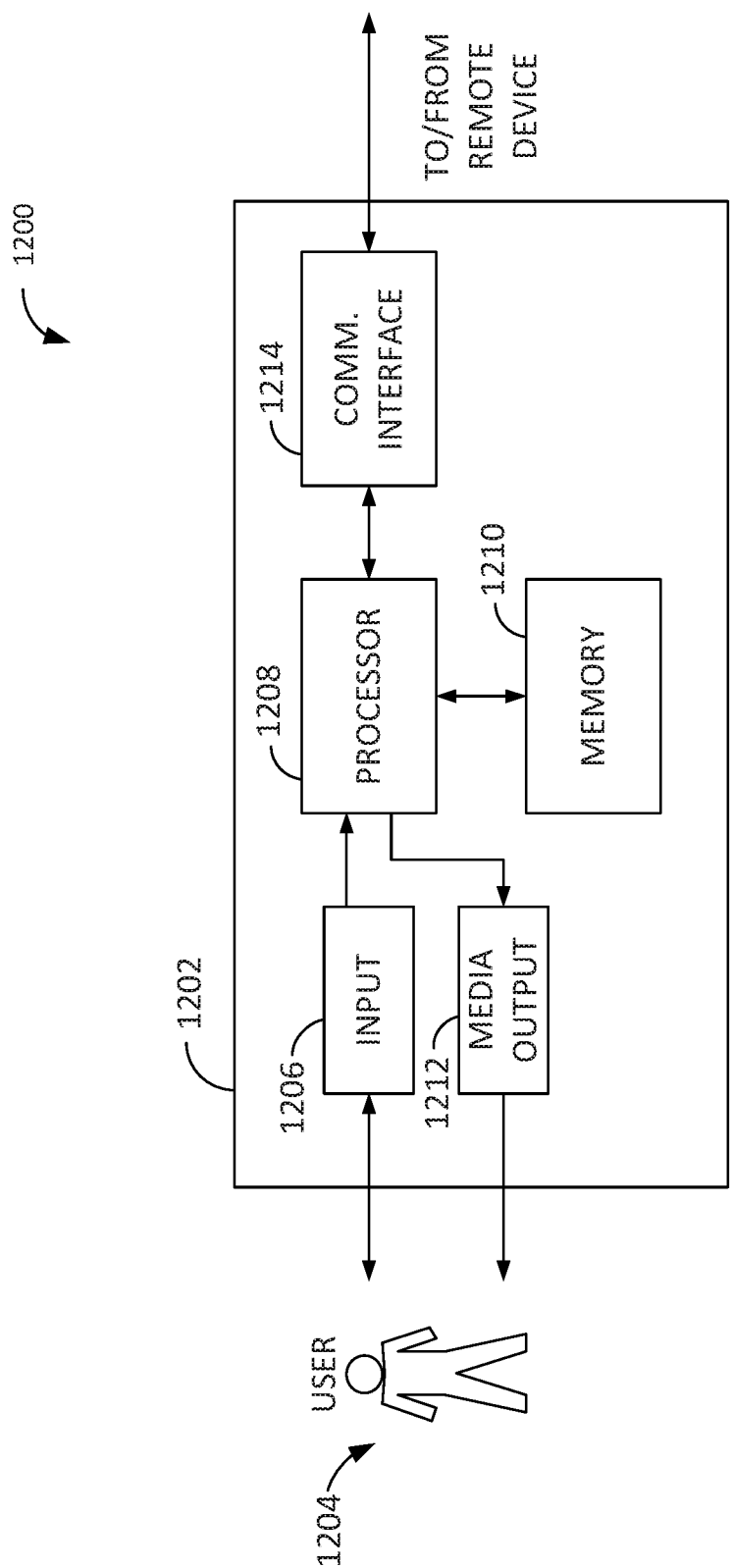
FIG. 12 illustrates an exemplary user computing device, such as one that might be included in the VR labeling computer system of FIG. 1.

FIG. 12 illustrates an exemplary configuration 1200 of an exemplary user computing device 1202, such as VR computing device 104 (shown in FIG. 1). In some embodiments, user computing device 1202 is in communication with model processing (MP) computing device, such as MP computing device 102 (shown in FIG. 1). User computing device 1202 may be representative of, but is not limited to VR computing device 104. For example, user computing device 1202 may be a VR headset or VR capable device, AR headgear, smart glasses, a smartphone, a tablet, a smartwatch, a wearable electronic, a laptop, a desktop, a vehicle computing device, or another type of computing device associated with user 108.

User computing device 1202 may be operated by user 1204 (e.g., user 108 of VR labeling computer system 100, shown in FIG. 1). User computing device 1202 may receive input from user 1204 via an input device 1206. User computing device 1202 includes a processor 1208 for executing instructions. In some embodiments, executable instructions may be stored in a memory area 1210. Processor 1208 may include one or more processing units (e.g., in a multi-core configuration). Memory area 1210 may be any device allowing information such as executable instructions and/or transaction data to be stored and retrieved. Memory area 1210 may include one or more computer-readable media.

User computing device 1202 also may include at least one media output component 1212 for presenting information to user 1204. Media output component 1212 may be any component capable of conveying information to user 1204. In some embodiments, media output component 1212 may include an output adapter (not shown), such as a video adapter and/or an audio adapter. An output adapter may be operatively coupled to processor 1208 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones). In some embodiments, media output component 1212 may be configured to present a graphical user interface (e.g., a web browser and/or a client application) to user 1204.

In some embodiments, user computing device 1202 may include input device 1206 for receiving input from user 1204. User 1204 may use input device 1206 to, without limitation, interact with VR labeling computer system 100 (e.g., using an app), VR computing device 104, matching computing device 102, or third party computing device 106 (shown in FIG. 1). Input device 1206 may include, for example, a camera, a LIDAR or radar sensor, a microphone, a keyboard, a pointing device, a mouse, a stylus, and/or a touch sensitive panel (e.g., a touch pad or a touch screen). A single component, such as a touch screen, may function as both an output device of media output component 1212 and input device 1206. User computing device 1202 may further include at least one sensor, including, for example, an audio input device, a video input device, a gyroscope, an accelerometer, a position detector, a biometric input device, and/or a telematics data collection device. In some embodiments, at least some data collected by user computing device 1202 may be transmitted to AD computing device 102.

User computing device 1202 may also include a communication interface 1214, communicatively coupled to any of matching computing device 102, automation server 106, deployment server 108, and/or third party applications server 110. Communication interface 1214 may include, for example, a wired or wireless network adapter and/or a wireless data transceiver for use with a mobile telecommunications network.

Stored in memory area 1210 may be, for example, computer-readable instructions for providing a user interface to user 1204 via media output component 1212 and, optionally, receiving and processing input from input device 1206. The user interface may include, among other possibilities, a web browser and/or a client application. Web browsers enable users, such as user 1204, to display and interact with media and other information typically embedded on a web page or a website hosted by MP computing device 102 and/or user computing device 1202. A client application may allow user 1204 to interact with, for example, any of MP computing device 102, VR computing device 104, and/or third party computing device 106. For example, instructions may be stored by a cloud service and the output of the execution of the instructions sent to the media output component 1212.

Exemplary Server Device Configuration

Figure 13:
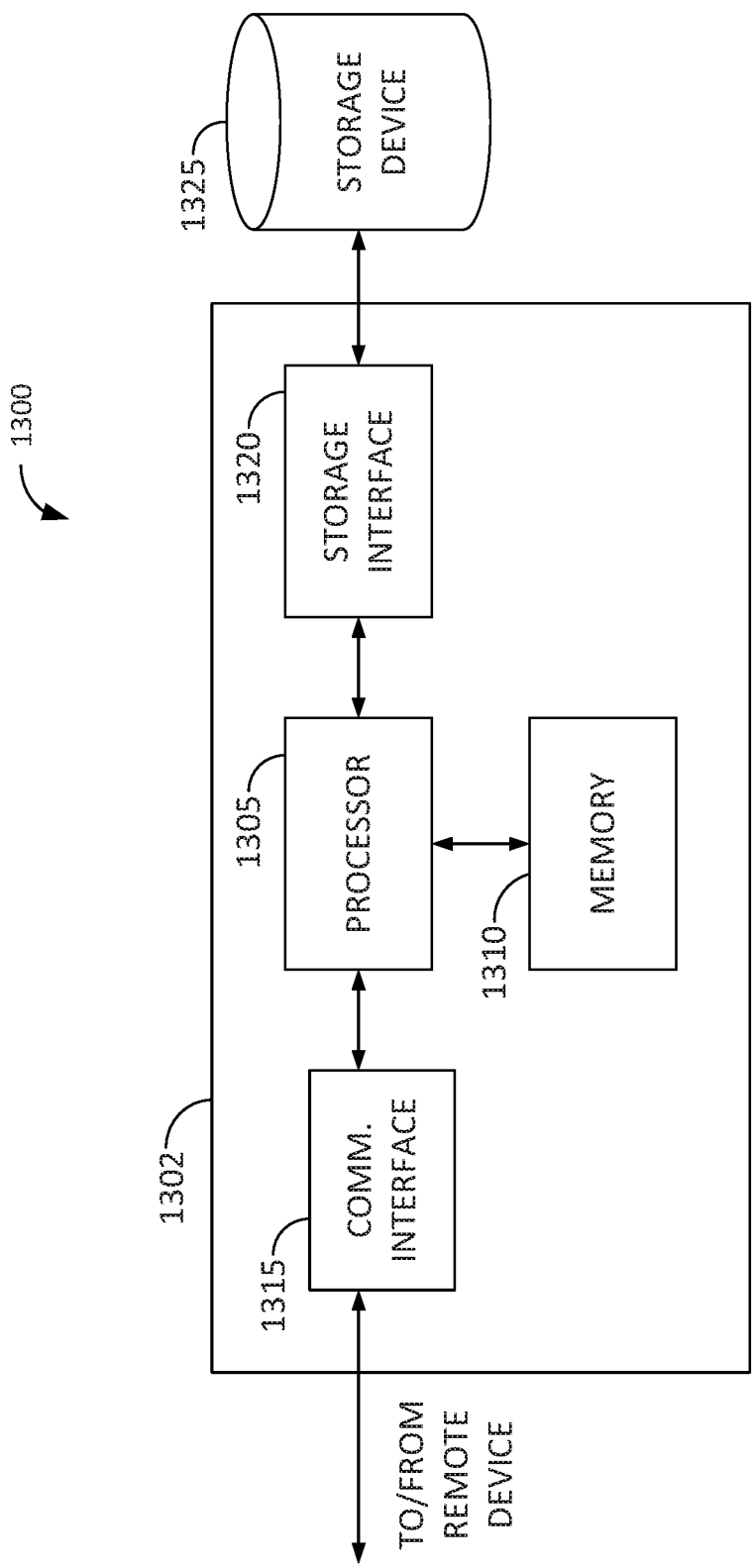
FIG. 13 illustrates an exemplary server computing system, such as one that might be included in the VR labeling computer system of FIG. 1.

FIG. 13 depicts an exemplary configuration 1300 of an exemplary server computing device 1302, in accordance with one embodiment of the present disclosure. Server computer device 1302 may include, but is not limited to, MP computing device 102 (shown in FIG. 1). Server computer device 1302 may include a processor 1305 for executing instructions. Instructions may be stored in a memory area 1310. Processor 1305 may include one or more processing units (e.g., in a multi-core configuration).

Processor 1305 may be operatively coupled to a communication interface 1315 such that server computer device 1302 may be capable of communicating with a remote device such as another server computer device 1302 or user 108 computing device, such as user computing device 1202 (shown in FIG. 12). For example, communication interface 1305 may receive requests from or transmit requests to user computing device 1202 via the Internet.

Processor 1305 may also be operatively coupled to a storage device 1325. Storage device 1325 may be any computer-operated hardware suitable for storing and/or retrieving data, such as, but not limited to, data associated with database 202 (shown in FIG. 2). In some embodiments, storage device 1325 may be integrated in server computer device 1302. For example, server computer device 1302 may include one or more hard disk drives as storage device 1325. In other embodiments, storage device 1325 may be external to server computer device 1302 and may be accessed by a plurality of server computer devices 1302. For example, storage device 1325 may include a storage area network (SAN), a network attached storage (NAS) system, and/or multiple storage units such as hard disks and/or solid state disks in a redundant array of inexpensive disks (RAID) configuration.

In some embodiments, processor 1305 may be operatively coupled to storage device 1325 via a storage interface 1320. Storage interface 1320 may be any component capable of providing processor 1305 with access to storage device 1325. Storage interface 1320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1305 with access to storage device 1325.

Processor 1305 executes computer-executable instructions for implementing aspects of the disclosure. In some embodiments, processor 1305 may be transformed into a special purpose microprocessor by executing computer-executable instructions or by otherwise being programmed.

Exemplary Computer Implemented Method

Figure 14:
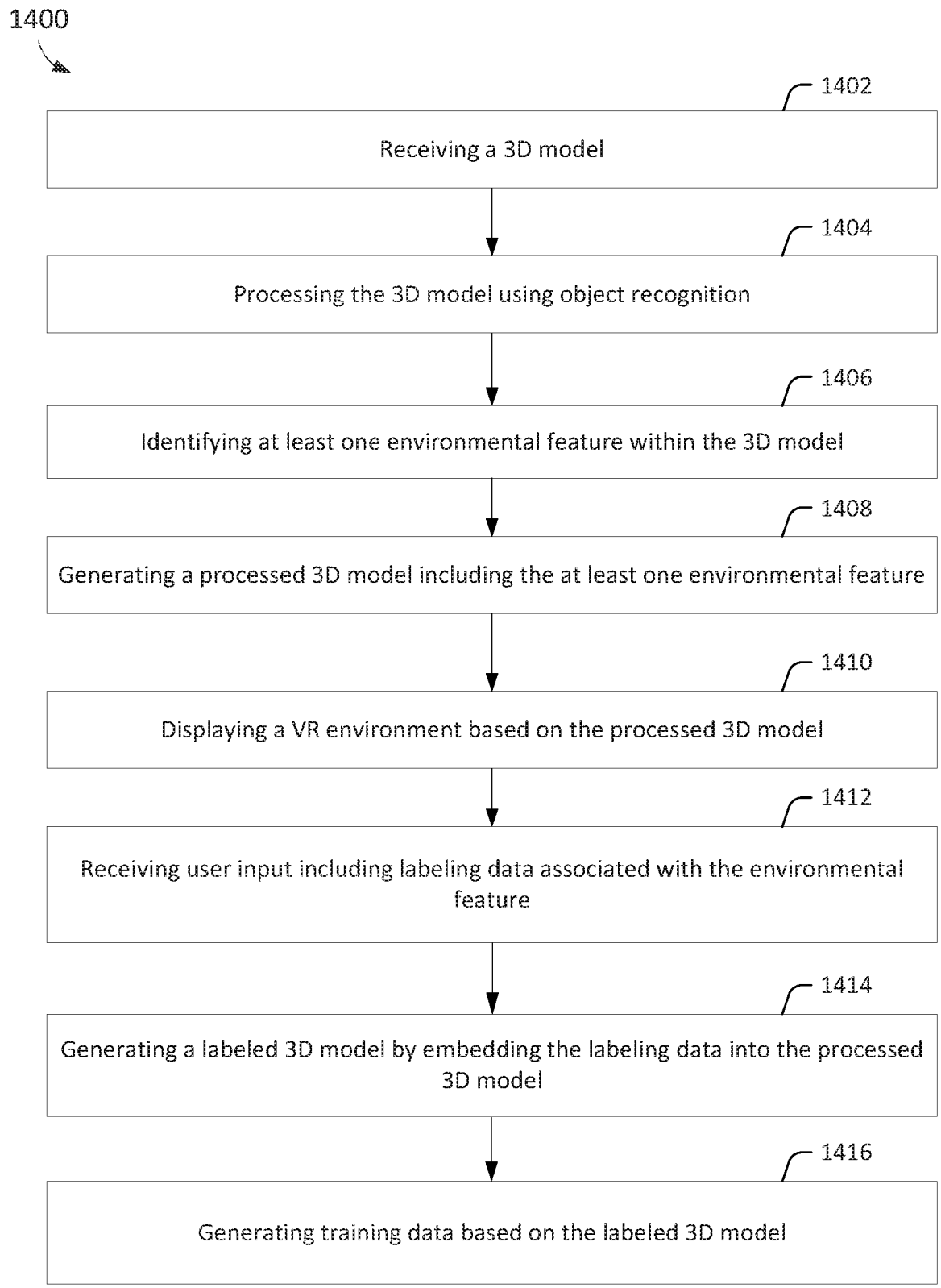
FIG. 14 illustrates a flow diagram describing a method that may be implemented by the VR labeling computer system of FIG. 1.

FIG. 14 depicts a flow chart illustrating a computer-implemented method 1400 for labeling a 3D model using VR. In the exemplary embodiment, method 1400 may be implemented by a matching computer system such as matching computer system 100 (shown in FIG. 1), and more specifically, by a matching computing device 102 (shown in FIG. 1).

Method 1400 may include receiving 1402 a 3D model. Method 1400 may also include processing 1404 the 3D model using object recognition and identifying 1406 at least one environmental feature within the 3D model.

Method 1400 may further include generating 1408 a processed 3D model including the at least one environmental feature, displaying 1410 a VR environment based upon the processed 3D model, and receiving 1412 user input including labeling data associated with the environmental feature.

Additionally, method 1400 may include generating 1414 a labeled 3D model by embedding the labeling data into the processed 3D model and generating 1416 training data based upon the labeled 3D model.

Exemplary Computing Device Diagram

Figure 15:
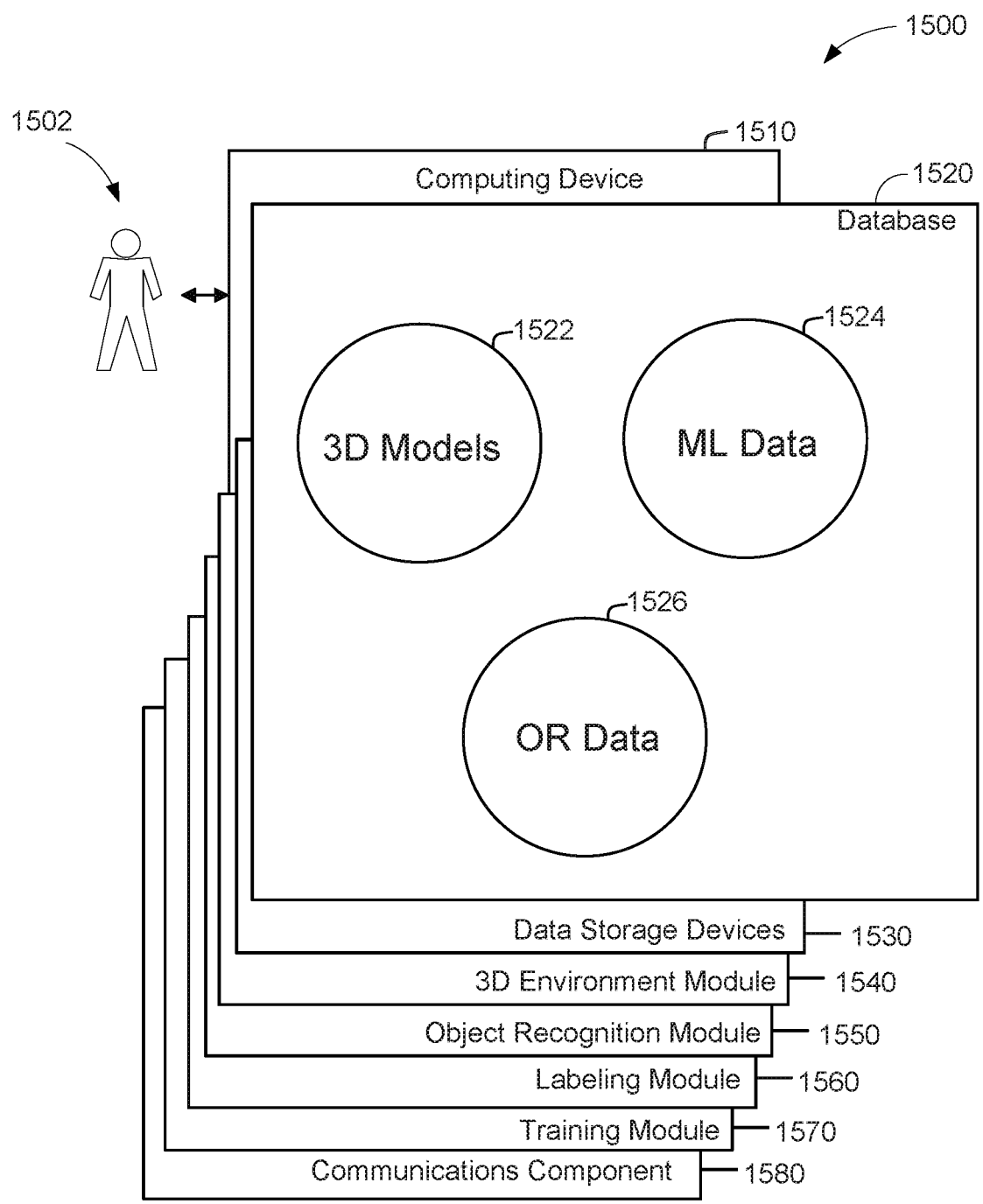
FIG. 15 illustrates a component diagram for a computing device that may be included in the VR labeling computer system of FIG. 1.

FIG. 15 depicts a diagram 1500 of components of one or more exemplary computing devices 1510 that may be used in VR labeling computer system 100 (shown in FIG. 1). In some embodiments, computing device 1510 may be similar to VR computing device 104 or MP computing device 102 (shown in FIG. 1). Database 1520 may be coupled with several separate components within computing device 1510, which perform specific tasks. In this embodiment, database 1520 may include 3D models 1522, ML data 1524, and OR data 1526. In some embodiments, database 1520 is similar to database 202 (shown in FIG. 2).

Computing device 1515 may include the database 1520, as well as data storage devices 1530. Computing device 1515 may also include 3D environment module 1540 (e.g., 3D environment module 404, shown in FIG. 4), object recognition (OR) module 1550 (e.g., OR module 406, shown in FIG. 4), labeling module 1560 (e.g., labeling module 408, shown in FIG. 4), and training module 1570 (e.g., training module 410, shown in FIG. 4). Moreover, computing device 1515 may include communications component 1560 for receiving and transmitting data, such as 3D models 1522, ML data 1524, and OR data 1526.

Exemplary Functionality

Labeling objects in 2D images is a common practice for training machine learning models in computer vision applications. The present embodiments are used to aid in the process of labeling 3D objects for training machine learning models in 3D computer vision applications.

The present embodiments include currently labeling objects in 3D data sets (specifically point clouds & potentially models) for machine learning applications. The short comings of using a 2D computer monitor to label 3D objects have been identified in that it is cumbersome, requires frequently adjusting perspective with a mouse, and takes considerable time. The present embodiments simplify and increase efficiency within this process. Object labeling in 3D data sets may potentially be a growing need in the future.

The present embodiments take advantage of immersive and intuitive nature of virtual reality technology to enhance and expedite the labeling process of 3D objects in a virtual space. Using machine learning to identify objects in a 3D space is a relatively new concept. Training machine learning models requires an abundance of labeled training data, and the present embodiments address a key inefficiency in that process for acquiring labeled training data in 3D applications.

In some embodiments, a user may operate in a base virtual reality (VR) space that they are able to load large 3D data sets (point cloud or 3D model). Using a VR headset allows the user to naturally adjust their area of focus, and using VR controllers allows the ability to navigate and manipulate the data set using additional degrees of freedom beyond a single mouse.

With the present embodiments, functionality may be incorporated into the virtual reality application to allow the use of hand controls for segmenting and labeling objects of interest. This may be used to quickly identify bounding boxes that contain an object, or utilize more specialized tools to allow isolation of an object that does not neatly fit into the confines of a box.

As a box tool example: Hand controls could quickly and/or simultaneously translate, rotate, and resize a box to accommodate the bounds of an object of interest. For example, placing a bounding box around a tree within a 3D rendering of a neighborhood.

As a polygon tool example: Hand controls can be used to create more complex volumes that encompass an object. This could be as simple as dropping pins within the VR environment that represent the boundaries of an object, creating a polygon mesh around the object of interest. For example, a user could walk along a virtual street, labeling the bounds of the road to isolate a roadway, while avoiding obstacles that may hang over the road (e.g., traffic lights, trees, etc.).

As a depth selection example: Hand controls can be used to select regions of an environment within a certain distance in the direction of a pointed hand control. Because the environment is virtual, rendering could be partially opaque, allowing the user to see through objects to aid in the depth selection. For example, a tire on an automobile could be selected by positioning the user next to the virtual automobile and selecting in the direction of the tire, but only to the depth that doesn't enter the engine cavity.

In some embodiments, 3D point clouds and 3D mesh data could be utilized in an experimental setting for analyzing data captured by drones for roof inspections, catastrophe response, and underwriting. Machine learning may be applied to these data types in order to extract information such as roof types, measurements, terrain details, proximity to hazards, vegetation types, etc. In order to classify the objects within these 3D data sets, human labeling is applied to 3D training data that represents those objects.

Labeling this 3D data via 2D monitors and mouse/keyboard is the approach that we are forced to use today which has significant drawbacks in visually perceiving and manipulating the data in order to appropriately label the data. This step requires an immense amount of human time and labor to accomplish, and as it requires the human to infer the 3D environment from 2D interfaces, mental fatigue and errors do occur.

The execution of the present embodiments may leverage 3D data from drones by reducing human time involvement for labeling while simultaneously increasing data labeling quality. Both achievements would positively influence our time to market and quality for object classification and detection within the machine learning algorithms we use.

In one embodiments, a tool may be created that enhances the process of "hand labeling" objects in a 3D space. For instance, 3D point clouds are the common medium used by autonomous vehicles for object detection and avoidance. These point clouds are consumed by machine learning algorithms within autonomous vehicles (AV) which require human training (i.e., data labeling) to know if a perceived object must be avoided. As AV progress into higher levels of automation, their perception of the world will require massive amounts of human training data. Unmanned Aircraft Systems (UAS), or drones, are also broaching this same autonomous domain with their detect and avoid technologies. Trends show potentially enormous growth in both AV and UAS industries, both of which will be dependent on adequately leveraging 3D point cloud training data. As noted, the present embodiments have the capability to improve human training for machine learning models by increasing efficiency and quality applied to 3D data in two fast growing industries.

The present embodiments may also result in cost savings being achieved by reducing the time necessary to label 3D data for machine learning. Improving machine learning algorithms to better detect roof shapes has the potential to reduce costs associated with rooftop measurement reports of today. The present embodiments may also be utilized to labels streets, trees, houses, buildings, man-made objects, vehicles, hi or low vegetation, roads, rooftops, etc.

Machine Learning & Other Matters

The computer systems and computer-implemented methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local or remote processors, transceivers, servers, and/or sensors (such as processors, transceivers, servers, and/or sensors mounted on mobile computing devices, or associated with smart infrastructure or remote servers), and/or via computer executable instructions stored on non-transitory computer-readable media or medium.

In some embodiments, a VR computing device and/or MP computing device are configured to implement machine learning ("ML"), such that the computing devices "learn" to analyze, organize, and/or process data in a way that is not explicitly programmed. At a high level, an untrained ML model is trained through the processing of training data, and a trained ML model capable of analyzing, organizing, and/or processing raw data is generated. An untrained ML model may be an undefined or partially defined function, for example a function with undefined coefficients. Training the untrained ML model may involve processing training data using ML algorithms, such that the ML algorithms generate outputs used to define and improve the functions defined by the untrained, or partially-trained, ML model. A fully defined or partially defined ML model may be considered a trained ML model, and the model may be capable of receiving data inputs and generating relevant ML outputs.

In one embodiment, ML inputs, which may be used as training data or for subsequent processing, may include, but are not limited to: 3D models, updated model data, processed model data, labeled model data, labels, annotations, identified environmental features, bounding frames, object recognition (OR) data, machine learning (ML) data, geolocation data, sensor inputs, and/or other user inputs. Machine learning outputs, which are outputs generated by a ML model based upon a ML input, may include, but are not limited to: identified environmental features, categorized or labeled environmental features, segmented objects and environmental features, labeled training data, trained ML models, updated model data, labeling data, processed model data, OR data, and/or ML data.

In one embodiment, ML techniques are employed using a ML module. In some embodiments, different ML models, algorithms, techniques, and methods may be implemented by the ML module. These ML models, algorithms, and methods may include, but are not limited to: linear or logistic regression, instance-based algorithms, regularization algorithms, decision trees, Bayesian networks, cluster analysis, association rule learning, artificial neural networks, deep learning, dimensionality reduction, and support vector machines. In various embodiments, the implemented ML methods and algorithms fall under at least one category of machine learning algorithm, such as supervised learning, unsupervised learning, and reinforcement learning.

In one embodiment, a ML module employs supervised learning, which involves identifying patterns in labeled training data in order to make predication about subsequently received data. Specifically, the ML module is trained using labeled training data, which includes example inputs labeled with example outputs. The ML module may process the training data using a supervised learning algorithm and generate a trained ML model that maps outputs to inputs based upon the training data. The trained ML model may be used to generate an output based upon a subsequently received input. For example, supervised learning may be utilized by VR labeling computer system in order to automatically identify environmental features. Specifically, an MP computing device may utilize an object recognition (OR) model that was trained using supervised learning. 3D models included identified, labeled trees for example, may be processed by the OR model such that the OR model "learns" to identify trees within a 3D model. MP computing device may then utilize the OR model to automatically identify trees in received 3D models.

In another embodiment, a ML module employs unsupervised learning, which involves finding meaningful relationships in unorganized data. Unlike supervised learning, unsupervised learning is trained using un-labeled training data. In other words, an unsupervised algorithm is provided with unlabeled training data and the algorithm generates a trained ML model based upon relationships the algorithm identifies within the data.

In another embodiment, a ML module employs reinforcement learning, which involves optimizing a ML model based upon reward signals. When a decision-making model, such as a ML model, generates an output based upon a particular input, the model receives a reward signal. A ML module may apply a reinforcement learning algorithm in order to optimize the decision-making model for receiving stronger reward signals.

ADDITIONAL EMBODIMENTS

In an additional embodiment, a computer-implemented method for labeling a three dimensional (3D) model using virtual reality (VR) is provided. The method is implemented by a computer system including at least one processor, and the method includes: (1) receiving, by the processor, the 3D model; (2) processing, by the processor, the 3D model using object recognition; (3) identifying at least one environmental feature within the 3D model; (4) generating, by the processor, a processed 3D model including the at least one environmental feature; (5) displaying a VR environment based upon the processed 3D model; (6) receiving user input including labeling data associated with the environmental feature; (7) generating a labeled 3D model by embedding the labeling data into the processed 3D model; and/or (8) generating, by the processor, training data based upon the labeled 3D model. The method may include additional, less, or alternate actions, including those discussed elsewhere herein.

For instance, an additional feature may be where the method further includes training a machine learning model using the training data, and/or training a machine learning model using the labeled 3D model. Another additional feature may be where the 3D model is a point cloud, and/or where the point cloud is generated based upon aerial photos of a real-world location.

Another additional feature may be where processing the 3D model using object recognition includes processing the 3D model using a segmentation technique, and/or where the segmentation technique is a semantic segmentation technique.

An additional feature may be where the method further includes: receiving user input creating a bounding frame within the VR environment, the bounding frame defining a 3D region within the 3D model, the 3D region including data representing the unidentified environmental feature; processing the data within the 3D region using object recognition; and/or identifying an environmental feature corresponding to the unidentified environmental feature represented by data within the 3D region.

Another additional feature may be where generating the processed 3D model further includes updating meta-data of data points representing the environmental feature, and/or where generating the processed 3D model further includes: generating data points representing the environmental feature; and embedding the data points representing the environmental feature into the 3D model.

An additional feature may be where the data points representing the environmental feature are a surface mesh, and/or where displaying the VR environment further includes altering the appearance of the surface mesh. Another additional feature may be where generating a labeled 3D model by embedding the labeling data into the processed 3D model further includes updating meta-data associated with the surface mesh.

Another additional feature may be where displaying the VR environment further includes altering the appearance of the environmental feature, and/or where altering the appearance of the environmental feature includes shading the environmental feature.

An additional feature may be where altering the appearance of the environmental feature includes outlining the environmental feature, where the user input includes hand gestures made within the VR environment, where the user input includes eye movement detected by the processor, and/or where the user input comprises spoken commands.

An additional feature may be where generating a labeled 3D model by embedding the labeling data into the processed 3D model further includes updating meta-data associated with the 3D model.

Additionally or alternatively, an additional feature may be where generating a labeled 3D model by embedding the labeling data into the processed 3D model further includes generating a surface mesh, embedding the surface mesh in the 3D model, and updating meta-data associated with the surface mesh.

An additional feature may be where generating the training data further includes: receiving a second labeled 3D model; and/or aggregating the labeled 3D model and the second labeled 3D model as training data.

An additional feature may be where generating the training data includes translating the labeled 3D model from a first file format to a second file format, and/or where generating the training data further includes: capturing a first and second element of the labeled 3D model; and/or aggregating the first and second elements of the labeled 3D model as training data.

In an additional embodiment, a virtual reality (VR) labeling computer system for labeling a three dimensional (3D) model using VR techniques is provided. The VR labeling computer system may include at least one processor in communication with at least one memory device, wherein the at least one processor may be configured to: (1) receive the 3D model; (2) process the 3D model using object recognition; (3) identify at least one environmental feature within the 3D model; (4) generate a processed 3D model including the at least one environmental feature; (5) display a VR environment based upon the processed 3D model; (6) receive user input including labeling data associated with the environmental feature; (7) generate a labeled 3D model by embedding the labeling data into the processed 3D model; and/or (8) generate training data based upon the labeled 3D model. The computer system may include additional, less, or alternate functionality, including that discussed elsewhere herein.

In an additional embodiment, at least one non-transitory computer-readable storage media having computer-executable instructions embodied thereon for labeling a three dimensional (3D) model using a virtual reality (VR) technique is provided. When executed by at least one processor, the computer-executable instructions cause the processor to: (1) receive the 3D model; (2) process the 3D model using object recognition; (3) identify at least one environmental feature within the 3D model; (4) generate a processed 3D model including the at least one environmental feature; (5) display a VR environment based upon the processed 3D model; (6) receive user input including labeling data associated with the environmental feature; (7) generate a labeled 3D model by embedding the labeling data into the processed 3D model; and/or (8) generate training data based upon the labeled 3D model. The instructions may direct additional, less, or alternate functionality, including that discussed elsewhere herein.

In an additional embodiment, a computer-implemented method for labeling a three dimensional (3D) model using virtual reality (VR) is provided. The method may be implemented by a VR labeling computer system including a model processing (MP) computing device and a VR computing device, and the method may include: (1) receiving, by the MP computing device, the 3D model, the 3D model including at least one unidentified environmental feature; (2) identifying, by the MP computing device, an environmental feature corresponding to the unidentified environmental feature based upon analysis of the 3D model; (3) transmitting, by the MP computing device, the 3D model and environmental feature to the VR computing device; displaying, by the VR computing device, the VR environment based upon the 3D model and environmental feature; (4) receiving, by the VR computing device, user input including labeling data associated with the environmental feature; transmitting, by the VR computing device, the 3D model, the environmental feature, and the labeling data to the MP computing device as a labeled 3D model; and/or (5) generating, by the MP computing device, training data comprising the labeled 3D model. The method may include additional, less, or alternate actions and features, including those discussed elsewhere herein.

For instance, an additional feature may be where the method further includes training a machine learning model using the training data. An additional feature may be where the method further includes: receiving, by the VR computing device, user input creating a bounding frame within the VR environment, the bounding frame defining a 3D region within the 3D model, the 3D region including data representing a second unidentified environmental feature; transmitting, by the VR computing device, the 3D model and bounding frame to a model processing (MP) computing device; and/or identifying, by the MP computing device, a second environmental feature corresponding to the second unidentified environmental feature based upon analysis of the data within the 3D region.

In an additional embodiment, a virtual reality (VR) labeling computer system for labeling a three dimensional (3D) model using VR is provided. The VR labeling computer system may include a VR computing device, a model processing (MP) computing device, and at least one processor in communication with at least one memory device, wherein the at least one processor may be configured to: (1) receive, by the MP computing device, the 3D model, the 3D model including at least one unidentified environmental feature; (2) identify, by the MP computing device, an environmental feature corresponding to the unidentified environmental feature based upon analysis of the 3D model; (3) transmit, by the MP computing device, the 3D model and environmental feature to the VR computing device; display, by the VR computing device, the VR environment based upon the 3D model and environmental feature; (4) receive, by the VR computing device, user input including labeling data associated with the environmental feature; (5) transmit, by the VR computing device, the 3D model, the environmental feature, and the labeling data to the MP computing device as a labeled 3D model; and/or (6) generate, by the MP computing device, training data comprising the labeled 3D model. The computer system may include additional, less, or alternate functionality, including that discussed elsewhere herein.

In an additional embodiment, at least one non-transitory computer-readable storage media having computer-executable instructions embodied thereon for labeling a three dimensional (3D) model using virtual reality (VR) is provided. When executed by at least one processor, the computer-executable instructions may cause the processor to: (1) receive, by a model processing (MP) computing device, the 3D model, the 3D model including at least one unidentified environmental feature; (2) identify, by the MP computing device, an environmental feature corresponding to the unidentified environmental feature based upon analysis of the 3D model; (3) transmit, by the MP computing device, the 3D model and environmental feature to a VR computing device; (4) display, by the VR computing device, the VR environment based upon the 3D model and environmental feature; (5) receive, by the VR computing device, user input including labeling data associated with the environmental feature; (6) transmit, by the VR computing device, the 3D model, the environmental feature, and the labeling data to the MP computing device as a labeled 3D model; and/or (7) generate, by the MP computing device, training data comprising the labeled 3D model. The instructions may direct additional, less, or alternate functionality, including that discussed elsewhere herein.

In an additional embodiment, a computer-implemented method for labeling a three dimensional (3D) model using an augmented reality (AR) technique is provided. The method may be implemented by an AR computer system including at least one processor, and the method may include: (1) receiving the 3D model; (2) processing the 3D model using object recognition; (3) identifying at least one environmental feature within the 3D model; (4) generating a processed 3D model including the at least one environmental feature; (5) displaying an AR environment based upon the processed 3D model; (6) receiving user input including labeling data associated with the environmental feature; (7) generating a labeled 3D model by embedding the labeling data into the processed 3D model; and/or (8) generating training data based upon the labeled 3D model. The method may include additional, less, or alternate actions and features, including those discussed elsewhere herein.

For instance, an additional feature may be where displaying an AR environment based upon the processed 3D model further includes: receiving a geolocation of an AR display device; comparing the geolocation of the AR display device to a geolocation of the 3D model; determining that the geolocation of the AR display device is within a certain range of the geolocation of the 3D model; and displaying, through the AR display device, elements of the 3D model overlaid on elements of a real-world environment based upon the geolocations.

In an additional embodiment, an augmented reality (AR) labeling computer system for labeling a three dimensional (3D) model using an AR technique may be provided. The AR labeling computer system may include at least one processor in communication with at least one memory device, wherein the at least one processor may be configured to: (1) receive the 3D model; (2) process the 3D model using object recognition; (3) identify at least one environmental feature within the 3D model; (4) generate a processed 3D model including the at least one environmental feature; (5) display an AR environment based upon the processed 3D model; (6) receive user input including labeling data associated with the environmental feature; (7) generate a labeled 3D model by embedding the labeling data into the processed 3D model; and/or (8) generate training data based upon the labeled 3D model. The computer system may include additional, less, or alternate functionality, including that discussed elsewhere herein.

In an additional embodiment, at least one non-transitory computer-readable storage media having computer-executable instructions embodied thereon for labeling a three dimensional (3D) model using augmented reality (AR) may be provided. When executed by at least one processor, the computer-executable instructions may cause the processor to: (1) receive the 3D model; (2) process the 3D model using object recognition; (3) identify at least one environmental feature within the 3D model; (4) generate a processed 3D model including the at least one environmental feature; (5) display an AR environment based upon the processed 3D model; (6) receive user input including labeling data associated with the environmental feature; (7) generate a labeled 3D model by embedding the labeling data into the processed 3D model; and/or (8) generate training data based upon the labeled 3D model. The instructions may direct additional, less, or alternate functionality, including that discussed elsewhere herein.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method for labeling a three dimensional (3D) model using virtual reality (VR) techniques, the method implemented by a computer system including at least one processor, the method comprising:
   receiving, by the processor, the 3D model;
   processing, by the processor, the 3D model using object recognition;
   identifying at least one environmental feature within the 3D model, wherein the at least one environmental feature is unidentified and unlabeled;
   generating, by the processor, a processed 3D model including the at least one environmental feature;
   displaying, through a VR device, a VR environment to a user based upon the processed 3D model, wherein the VR environment includes the at least one environmental feature;
   prompting, through the VR environment, the user to input (i) labeling data for the environmental feature through user interaction with the VR device and (ii) boundary data by creating a bounding frame within the VR environment, wherein the labeling data identifies the environmental feature, wherein the bounding frame delineates a 3D region within the 3D model, and wherein the 3D region includes data representing the environmental feature;
   processing, by the VR device, (i) the data within the 3D region using object recognition and (ii) the user input associated with the environmental feature;
   identifying an environmental feature corresponding to the environmental feature represented by data within the 3D region;
   generating a labeled 3D model by embedding the labeling data and the boundary data for the environmental feature into the processed 3D model;
   extracting the environmental feature and associated labeling data and boundary data from the labeled 3D model; and
   generating, by the processor, training data based upon the extracted environmental feature of the labeled 3D model.

2. The computer-implemented method of claim 1, the method further comprising:
   training a machine learning model using the training data.

3. The computer-implemented method of claim 1, the method further comprising:
   training a machine learning model using the labeled 3D model.

4. The computer-implemented method of claim 1, wherein the 3D model is a point cloud.

5. The computer-implemented method of claim 4, wherein the point cloud is generated based upon aerial photos of a real-world location.

6. The computer-implemented method of claim 1, wherein processing the 3D model using object recognition includes processing the 3D model using a segmentation technique.

7. The computer-implemented method of claim 6, wherein the segmentation technique is a semantic segmentation technique.

8. The computer-implemented method of claim 1, wherein generating the processed 3D model further comprises updating meta-data of data points representing the environmental feature.

9. The computer-implemented method of claim 1, wherein generating the processed 3D model further comprises:
   generating data points representing the environmental feature; and
   embedding the data points representing the environmental feature into the 3D model.

10. The computer-implemented method of claim 9, wherein the data points representing the environmental feature are a surface mesh.

11. The computer-implemented method of claim 10, wherein displaying the VR environment further comprises altering the appearance of the surface mesh.

12. The computer-implemented method of claim 11, wherein altering the appearance of the environmental feature includes shading the environmental feature.

13. The computer-implemented method of claim 11, wherein altering the appearance of the environmental feature includes outlining the environmental feature.

14. The computer-implemented method of claim 10, wherein generating a labeled 3D model by embedding the labeling data into the processed 3D model further comprises updating meta-data associated with the surface mesh.

15. The computer-implemented method of claim 1, wherein displaying the VR environment further comprises altering the appearance of the environmental feature.

16. The computer-implemented method of claim 1, wherein the user input comprises hand gestures made within the VR environment.

17. The computer-implemented method of claim 1, wherein the user input comprises eye movement detected by the processor.

18. The computer-implemented method of claim 1, wherein the user input comprises spoken commands.

19. The computer-implemented method of claim 1, wherein generating a labeled 3D model by embedding the labeling data into the processed 3D model further comprises updating meta-data associated with the 3D model.

20. The computer-implemented method of claim 1, wherein generating a labeled 3D model by embedding the labeling data into the processed 3D model further comprises generating a surface mesh, embedding the surface mesh in the 3D model, and updating meta-data associated with the surface mesh.

21. The computer-implemented method of claim 1, wherein generating the training data further comprises:
   receiving a second labeled 3D model; and
   aggregating the labeled 3D model and the second labeled 3D model as training data.

22. The computer-implemented method of claim 1, wherein generating the training data includes translating the labeled 3D model from a first file format to a second file format.

23. The computer-implemented method of claim 1, wherein generating the training data further comprises:
   capturing a first and second element of the labeled 3D model; and
   aggregating the first and second elements of the labeled 3D model as training data.

24. A virtual reality (VR) labeling computer system for labeling a three dimensional (3D) model using VR techniques, the VR labeling computer system including at least one processor in communication with at least one memory device, wherein the at least one processor is configured to:
   receive the 3D model;
   process the 3D model using object recognition;
   identify at least one environmental feature within the 3D model, wherein the at least one environmental feature is unidentified and unlabeled;
   generate a processed 3D model including the at least one environmental feature;
   display, through a VR device, a VR environment to a user based upon the processed 3D model, wherein the VR environment includes the at least one environmental feature;
   prompt, through the VR environment, the user to input (i) labeling data for the environmental feature through user interaction with the VR device and (ii) boundary data by creating a bounding frame within the VR environment, wherein the labeling data identifies the environmental feature, wherein the bounding frame delineates a 3D region within the 3D model, and wherein the 3D region includes data representing the environmental feature;
   process, by the VR device, (i) the data within the 3D region using object recognition and (ii) the user input associated with the environmental feature;
   identify an environmental feature corresponding to the environmental feature represented by data within the 3D region;
   generate a labeled 3D model by embedding the labeling data and the boundary data for the environmental feature into the processed 3D model;
   extract the environmental feature and associated labeling data and boundary data from the labeled 3D model; and
   generate training data based upon the extracted environmental feature of the labeled 3D model.

25. At least one non-transitory computer-readable storage media having computer-executable instructions embodied thereon for labeling a three dimensional (3D) model using a virtual reality (VR) technique, wherein when executed by at least one processor, the computer-executable instructions cause the processor to:
   receive the 3D model;
   process the 3D model using object recognition;
   identify at least one environmental feature within the 3D model, wherein the at least one environmental feature is unidentified and unlabeled;
   generate a processed 3D model including the at least one environmental feature;
   display, through a VR device, a VR environment to a user based upon the processed 3D model, wherein the VR environment includes the at least one environmental feature;
   prompt, through the VR environment, the user to input (i) labeling data for the environmental feature through user interaction with the VR device and (ii) boundary data by creating a bounding frame within the VR environment, wherein the labeling data identifies the environmental feature, wherein the bounding frame delineates a 3D region within the 3D model, and wherein the 3D region includes data representing the environmental feature;
   process, by the VR device, (i) the data within the 3D region using object recognition and (ii) user input associated with the environmental feature;
   identify an environmental feature corresponding to the environmental feature represented by data within the 3D region;
   generate a labeled 3D model by embedding the labeling data and the boundary data for the environmental feature into the processed 3D model;
   extract the environmental feature and associated labeling data and boundary data from the labeled 3D model; and
   generate training data based upon the extracted environmental feature of the labeled 3D model.

* * * * *